US011282140B1

(12) United States Patent
Kavounas et al.

(10) Patent No.: US 11,282,140 B1
(45) Date of Patent: Mar. 22, 2022

(54) DETERMINING RESOURCE PER DIGITAL RULES FOR FIRST DATASET IN CONTEXT OF MATCHING IT WITH COMPATIBLE SECOND DATASET

(71) Applicant: Avalara, Inc., Seattle, WA (US)

(72) Inventors: Gregory T. Kavounas, Bellevue, WA (US); Mark Janzen, Seattle, WA (US); Rahul Aggarwal, Pune (IN); Bilkay Rose, Seattle, WA (US)

(73) Assignee: Avalara, Inc., Seattle, WA (US)

( * ) Notice: Subject to any disclaimer, the term of this patent is extended or adjusted under 35 U.S.C. 154(b) by 42 days.

(21) Appl. No.: 16/900,331

(22) Filed: Jun. 12, 2020

Related U.S. Application Data

(60) Provisional application No. 62/884,554, filed on Aug. 8, 2019, provisional application No. 62/861,218, filed on Jun. 13, 2019.

(51) Int. Cl.

| | |
|---|---|
| *G06Q 40/00* | (2012.01) |
| *G06Q 40/04* | (2012.01) |
| *G06Q 30/00* | (2012.01) |
| *G06F 16/93* | (2019.01) |
| *G06Q 20/38* | (2012.01) |
| G06F 3/04847 | (2022.01) |
| G06F 3/0482 | (2013.01) |

(52) U.S. Cl.
CPC ............ *G06Q 40/04* (2013.01); *G06F 16/93* (2019.01); *G06Q 20/38215* (2013.01); *G06Q 30/016* (2013.01); *G06Q 40/10* (2013.01); *G06F 3/0482* (2013.01); *G06F 3/04847* (2013.01)

(58) Field of Classification Search
CPC combination set(s) only.
See application file for complete search history.

(56) References Cited

U.S. PATENT DOCUMENTS

| | | |
|---|---|---|
| 7,783,536 B2 | 8/2010 | William et al. |
| 7,933,803 B1 | 4/2011 | Nadler et al. |
| 8,620,578 B1 | 12/2013 | Brown et al. |
| 8,725,407 B2 | 5/2014 | Hurley et al. |
| 9,760,915 B2 | 9/2017 | Pavlou et al. |
| 10,445,818 B1 | 10/2019 | Chowdhary |
| 10,769,611 B2 | 9/2020 | McNeel |
| 2007/0136158 A1 | 6/2007 | Rawlings et al. |
| 2007/0136159 A1 | 6/2007 | Rawlings et al. |
| 2008/0133295 A1* | 6/2008 | Cappel .................. G06Q 40/10 705/36 T |

* cited by examiner

*Primary Examiner* — William E Rankins
(74) *Attorney, Agent, or Firm* — Seed IP Law Group LLP

(57) ABSTRACT

An Online Software Platform (OSP) may receive a first dataset from a remote client device, and compute an estimated resource, from the first dataset and also per stored digital rules. The OSP may then communicate an aspect of the resource to the remote client device and receive a confirmation of the first dataset. The OSP may then process the first dataset, for matching it with another dataset, either internally or by outsourcing. Either way, the OSP may establish that the first dataset has been matched with a compatible second dataset. The OSP may then input a resource for the first dataset, which is determined according to stored digital rules. The OSP may further create one or more notifications and documents about the matching and the resource, and make them available to the remote client device or even to the device of another remote entity.

33 Claims, 22 Drawing Sheets

401 411 412

| CERTIFICATE CODE | CERTIFICATE TYPE |
|---|---|
| [CODE_01] | TYPE_A |
| [CODE_02] | TYPE_A |
| [CODE_03] | TYPE_A |
| [CODE_04] | TYPE_A |
| .... | .... |
| [CODE_11] | TYPE_B |
| [CODE_12] | TYPE_B |
| [CODE_13] | TYPE_B |
| [CODE_14] | TYPE_B |
| .... | .... |

FIGURE 4A

414 CONDITIONS  415 CONDITIONS  419 CONSEQUENTS

470

| CERTIFICATE TYPE | POLARITY | INDICATED PERCENTAGE FOR (MATCHED SIZE NUMBER) X (STRIKE NUMBER) |
|---|---|---|
| TYPE_A | POSITIVE | 0.0002 |
| TYPE_A | NEGATIVE | 0.0002 |
| TYPE_B | POSITIVE | 0.0001 |
| TYPE_B | NEGATIVE | 0.0001 |

FIGURE 4B

FIGURE 6 — METHODS

USE CASE:
ONLINE STOCK BROKERS
PAYING TRANSACTION TAX

1922 USER INTERFACE

........................(YOUR ONLINE STOCK BROKER).......................

[Menu1] [Menu2] [Button3] [Logout]

CLIENT SETTINGS – TRANSACTION TAXES FOR TRADING

TAX FILING RETURNS AND REMITTANCES

☑ Yes ☐ No    Please also prepare returns for me for these transaction taxes upon executing my trades, and send these returns to me.

☑ Yes ☐ No    Please also prepare returns for me for these transaction taxes upon executing my trades, and file these returns for me with the tax authorities.

☑ Yes ☐ No    Please also remit my transaction taxes due upon executing my trades, by withdrawing from my account.

1971
1972
1973

*SAMPLE USER INTERFACE BY ONLINE STOCK BROKER*

FIGURE 19

| Trade Stocks | Extended hours | | | | |
|---|---|---|---|---|---|
| 1. Enter Order | | 2. Verify Order | | 3. Order received | |
| Symbol | Action | Quantity | Order Type | Timing | |
| MSFT | Buy | 100 shares | Market | Day Only | |
| Reinvest Dividends: No | | | Expires at the end of the trading day if not filled | | |
| | | | Estimated amount: | $12,724.00 | ← 2371 |
| | | | Commission | $0.00 | ← 2372 |
| | | | Estimated Fed. tax | $6.36 | ← 2373 |
| | | | Estimated State tax | $2.55 | ← 2374 |
| | | | (Other) tax | $2.55 | ← 2375 |
| | | | Estimated total amount | $12,735.46 | ← 2376 |
| MSFT – MICROSOFT CORP 126.22 +0 Bid 127.10 Ask 127.24 | | | | | |
| | | | | | |
| Before placing this order, please verify it is correct, and read your Order Messages | | | | | |
| | | Do not Place Order | Change | Place Order | |

FIGURE 23 — *SAMPLE USER INTERFACE FOR ENTERING A BUY ORDER, AFTER THE ESTIMATE AND PRIOR TO CONFIRMING ORDER*

| Trade Stocks | Extended hours | | | | |
|---|---|---|---|---|---|
| 1. Enter Order | | 2. Verify Order | | 3. Order received | |
| Symbol | Action | Quantity | Order Type | Timing | |
| MSFT | Sell | 100 shares | Market | Day Only | |
| Reinvest Dividends: N/A | | Expires at the end of the trading day if not filled | | | |
| | | | | Estimated amount: | $12,710.00 ← 2471 |
| | | | | Commission | $0.00 ← 2472 |
| | | | | Estimated Fed. tax | $6.36 ← 2473 |
| | | | | Estimated State tax | $2.54 ← 2474 |
| | | | | (Other) tax | $2.54 ← 2475 |
| | | | | Estimated total amount | $12,698.56 ← 2476 |
| MSFT – MICROSOFT CORP 126.22 +0 Bid 127.10 Ask 127.24 | | | | | |
| Before placing this order, please verify it is correct, and read your Order Messages | | | | | |
| | | Do not Place Order | | Change | Place Order |

Labels: 2452, 2451, 2453, 2454, 2432

FIGURE 24

*SAMPLE USER INTERFACE FOR ENTERING A SELL ORDER, AFTER THE ESTIMATE AND PRIOR TO CONFIRMING ORDER*

2528

| TRADE CONFIRMATION |||||
|---|---|---|---|---|
| Symbol | Action | Quantity | Unit price ||
| MSFT | BOUGHT | 100 shares | $127.13 ||
| | Reinvest Dividends: No | | ||
| | | | Purchase Amount: | $12,713.00 ←—2571 |
| | | | Commission | $0.00 |
| | | | Fed. tax | $6.36 ←—2573 |
| | | | State tax | $2.54 ←—2574 |
| | | | (Other) tax | $2.54 ←—2575 |
| | | | Total amount | $12,724.44 ←—2576 |
| Confirmation Messages<br><br>Transaction ID: NN01B |||||

*SAMPLE TRADE CONFIRMATION*

DETERMINING RESOURCE PER DIGITAL RULES FOR FIRST DATASET IN CONTEXT OF MATCHING IT WITH COMPATIBLE SECOND DATASET

CROSS REFERENCE TO RELATED PATENT APPLICATIONS

This patent application claims priority from U.S. provisional patent application Ser. No. 62/861,218 filed on Jun. 13, 2019 and U.S. provisional patent application, and Ser. No. 62/884,554 filed on Aug. 8, 2019.

BACKGROUND

Online software platforms perform computations for clients by communicating with devices of the clients over computer networks. Yet providing, in a timely and efficient manner, accurate and reliable determinations of resources for use by entities other than these platforms and their clients presents a technical problem for current online software platforms, where the determinations involve specialized matching of datasets provided by different clients.

An additional technical problem is communicating such determinations to such entities and to the clients in conjunction with other communications to them in a timely and efficient manner over computer networks and in a way that integrates well into existing technical environments.

All subject matter discussed in this Background section of this document is not necessarily prior art, and may not be presumed to be prior art simply because it is presented in this Background section. Plus, any reference to any prior art in this description is not, and should not be taken as, an acknowledgement or any form of suggestion that such prior art forms parts of the common general knowledge in any art in any country. Along these lines, any recognition of problems in the prior art discussed in this Background section or associated with such subject matter should not be treated as prior art, unless expressly stated to be prior art. Rather, the discussion of any subject matter in this Background section should be treated as part of the approach taken towards the particular problem by the inventors. This approach in and of itself may also be inventive.

BRIEF SUMMARY

The present disclosure provides systems, computer-readable media, and methods that solve these technical problems, thus improving the technology of online software systems.

In embodiments, an Online Software Platform (OSP) may receive a first dataset from a remote client device, and compute an estimated resource, from the first dataset and also per stored digital rules. The OSP may then communicate an aspect of the resource to the remote client device and receive a confirmation of the first dataset. The OSP may then process the first dataset, for matching it with another dataset, either internally with other received datasets or by outsourcing. Either way, the OSP may establish that the first dataset has been matched with a compatible second dataset. The OSP may then input a resource for the first dataset, which is determined according to stored digital rules. The OSP may further create one or more notifications and documents about the matching and the resource, and make them available to the remote client device or even to the device of another remote entity.

An advantage can be that the systems, computer-readable media, and methods described in this document for determinations of resources for use by entities other than online software platforms or their clients, where the determinations involve specialized matching of datasets provided by different clients, improve the functioning of computer or other hardware. The improvements can be by reducing the processing, storage, and/or data transmission resources needed to perform these types of tasks, thereby enabling the tasks to be performed by less capable, capacious, and/or expensive hardware devices, enabling the tasks to be performed with less latency and/or preserving more of the conserved resources for use in performing other tasks or additional instances of the same task.

These and other features and advantages of the claimed invention will become more readily apparent in view of the embodiments described and illustrated in this specification, namely in this written specification and the associated drawings.

BRIEF DESCRIPTION OF THE DRAWINGS

FIG. 4A shows a sample look-up table that provides classifications of certificate codes for use by digital rules according to embodiments.

FIG. 4B shows a sample look-up table that uses the table of FIG. 4A to implement digital main rules according to embodiments.

FIG. 19 is a diagram of a sample settings User Interface (UI) for a use case where an online stock broker enables a trading client to adjust their personal preferences for service.

FIG. 23 is a diagram of a sample User Interface (UI) for a use case where an online stock broker enables a trading client to enter an order for trading securities, at an instant where a buy order is being entered.

FIG. 24 is a diagram of a sample User Interface (UI) for a use case where an online stock broker enables a trading client to enter an order for trading securities, at an instant where a sell order is being entered for the same security as the buy order of FIG. 23.

FIG. 25 is a diagram of a sample User Interface (UI) for a use case where an online stock broker furnishes the trading client of FIG. 23 a trade confirmation that their buy order has been filled.

DETAILED DESCRIPTION

As has been mentioned, the present description is about computer systems, storage media that may store programs, and methods. Embodiments are now described in more detail.

Figure 1:
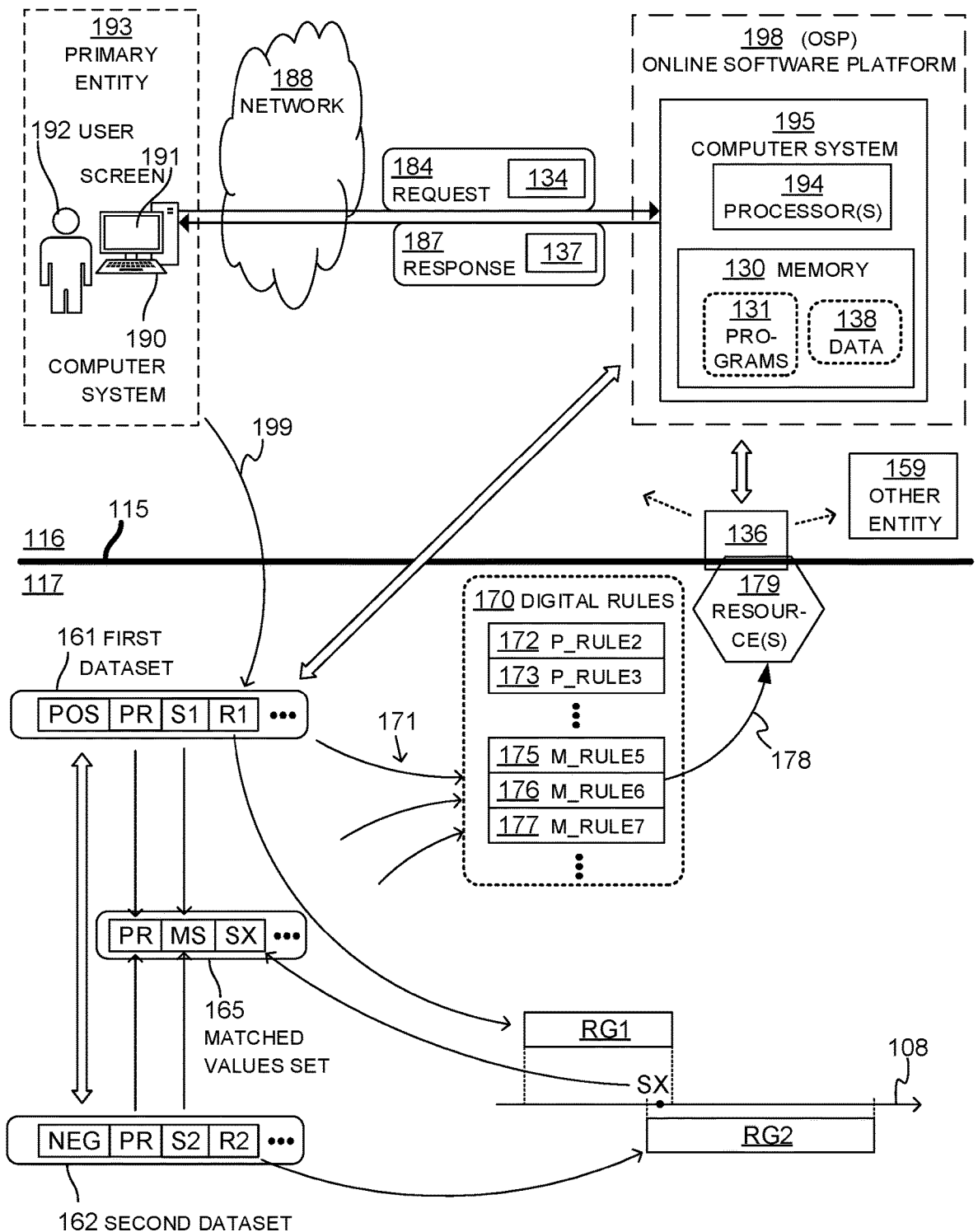
FIG. 1 is a diagram showing sample aspects of embodiments.

FIG. 1 is diagram showing sample aspects of embodiments. A thick line 115 separates FIG. 1, although not completely or rigorously, into a top portion 116 and a bottom portion 117. The top portion 116 emphasizes mostly entities, components, their relationships, and their interactions, while the bottom portion 117 emphasizes mostly processing of data that takes place often within one or more of the components in the top portion 116.

In the top portion 116, a sample computer system 195 according to embodiments is shown. The computer system 195 has one or more processors 194 and a memory 130. The memory 130 stores programs 131 and data 138. Additional implementation details for the computer system 195 are given later in this document. The computer system 195 may optionally be implemented as part of an online software platform (OSP) 198. The OSP can be configured to perform one or more predefined services. Such services can be searches, determinations, computations, verifications, notifications, the transmission of specialized information, including data that effectuates payments, the generation and transmission of documents, the online accessing other systems to effect registrations, and so on, including what is described in this document.

A user 192 may be standalone. The user 192 may use a computer system 190 that has a screen 191. Additional sample implementation details for the computer system 190 are given later in this document. In embodiments, the user 192 and the computer system 190 are considered part of a primary entity 193, which can be referred to also merely as entity. In such instances, the user 192 can be an agent of the entity 193, and even within a physical site of the entity 193, although that is not necessary. The entity 193 can be a client the OSP 198.

The computer system 190 may access the computer system 195 via a communications network 188, such as the internet. Such accessing can be performed, for instance, by the computer system 190 and the computer system 195 exchanging requests and responses with each other. Additionally, downloading may be permitted from one of these two computer systems to the other, and so on. In such embodiments, the computer system 190 can be considered to be a remote client device, at least from the perspective of the computer system 195.

In embodiments, the computer system 195 receives one or more datasets. A sample received first dataset 161 is shown below the line 115. The dataset 161 may be received by the computer system 195 in a number of ways. In some embodiments, one or more requests may be received by the computer system 195 via a network. In this example, a request 184 is received by the computer system 195 via the network 188. The request 184 has been transmitted by the remote computer system 190, which is a remote client device. The received one or more requests can carry payloads. In this example, the request 184 carries a payload 134. In such embodiments, the one or more payloads may be parsed by the computer system to extract the dataset. In this example, the payload 134 can be parsed by the computer system 195 to extract the dataset 161. In this example the single payload 134 encodes the entire dataset 161, but that is not required. In fact a dataset can be received from the payloads of multiple requests. In such cases, a single payload may encode only a portion of the dataset. And, of course, the payload of a single request may encode multiple datasets. Additional computers may be involved with the network 188, some beyond the control of the user 192 or OSP 198, and some within such control.

The first dataset 161 has first values, which can be numerical, alphanumeric, Boolean, and so on, as needed for what the values characterize. One or more of these first values of the dataset 161 may characterize an attribute of the entity 193, as indicated by an arrow 199. (It should be noted that the arrow 199 describes a correspondence, but not the journey of data in becoming the received dataset 161.)

The first values of the dataset 161 include a first polarity value POS, which stands for "positive". The polarity value is one of two opposite possible values and, accordingly, the opposite polarity value could be NEG for "negative". Beyond being opposite, it does not matter how the polarity values are designated, for example one could be "true" the other "false", one "zero" and the other "one", and so on. These first values also include a certificate code value PR, which identifies a certain certificate among a plurality of possible certificates. These first values further include a first size number S1 that identifies a number of units of the certain certificate indicated by the certificate code value PR. These first values additionally include at least one first range value R1, although such ranges may be defined more easily with two or more values, such as a beginning and an end, or a single number and an indication that the number is a maximum or a minimum. In any event, the first range value R1, alone or together with another first value, may define a first numerical acceptable range for matching the first dataset 161.

There can be more first values that are not shown, as indicated by the horizontal dot-dot-dot in the dataset 161. For example, one value could be for an identity of the first dataset 161, so as to differentiate it from other such datasets. Another value may be an entity value for the user 192 of the first remote client device 190. In such instances, locus information of the user 192 can be determined from the entity value. For example, the locus information can be encoded in the entity value. Or, the entity value can encode an identity of the user, such as by a client serial number, a client record number and so on. In such a case, a stored record of the identity of the user may contain the locus information, as part of data 138. In such a case, the computer system 195 may identify the stored record from the entity value, and thus look up the locus information from the identified record. The locus information may reveal applicable portions of the location of the user 192.

In embodiments, it can be established, by the computer system 195, that matching has been achieved between the first dataset 161 and a second dataset 162. For the matching to have taken place, the second dataset 162 must be compatible with the first dataset 161. Compatibility may be determined by whether or not compatibility criteria are met between the first values of the first dataset 161 and the second values of the second dataset 162. In the example of FIG. 1, the matching is shown by a wide vertical arrow, and has produced a matched values set 165. In particular, the second dataset 162 can have second values, which can be analogous to the first values. In particular, the second values may including a second polarity value NEG, which stands for "negative", and is opposite to the first polarity value POS of the first dataset 161. In addition, the second dataset 162 may have a certificate code value PR that identifies the certain certificate code that is identified by the certificate code value PR of the first dataset 161. Plus the second dataset 162 may have a second size number S2 that identifies a number of units of the certain certificate. And, the second dataset 162 may have at least one second range value R2 that defines a second numerical acceptable range for matching the second dataset 162. As with the first dataset 161, the second range value R2 may do this alone or together with another second value.

Figure 2:
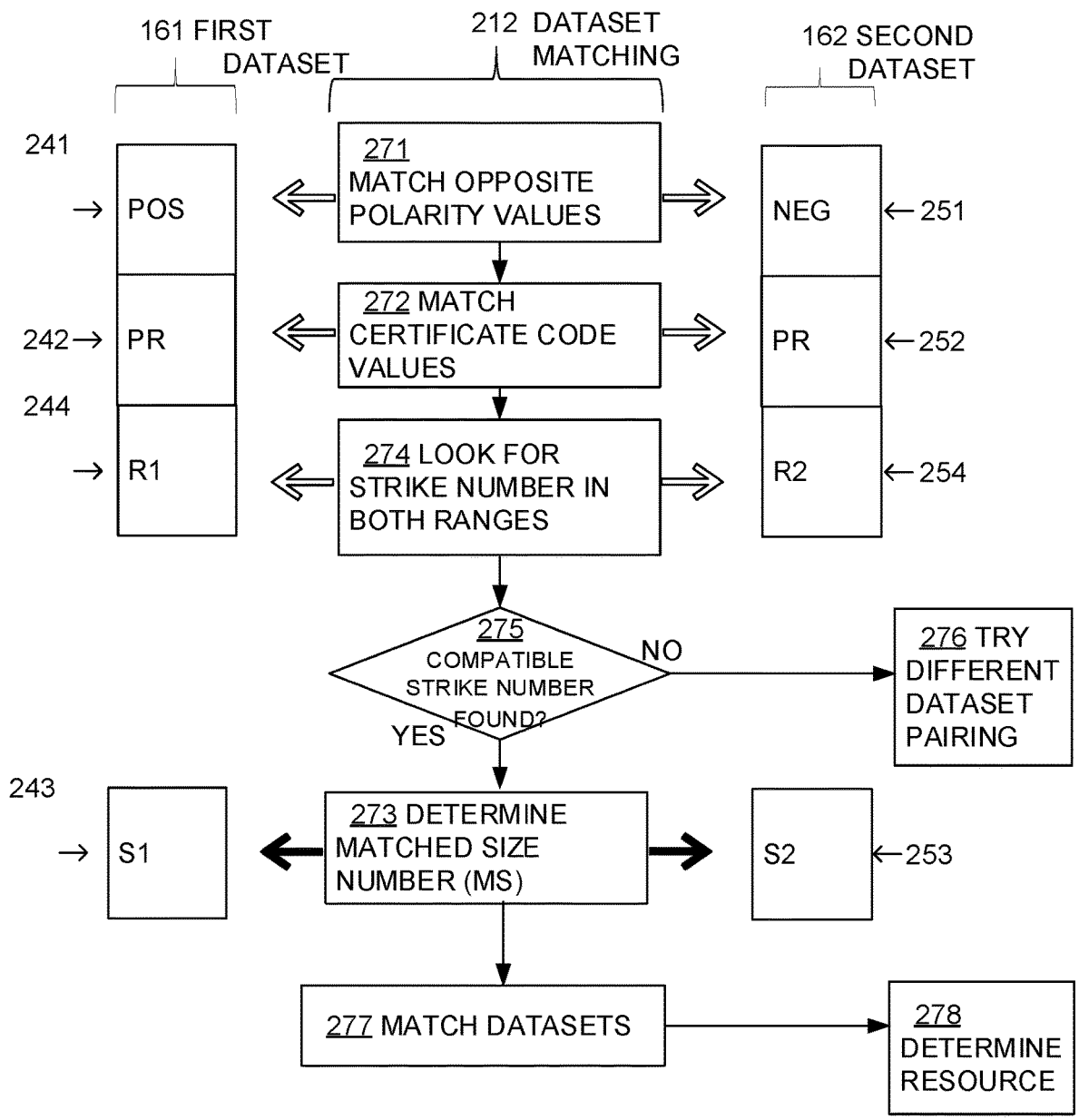
FIG. 2 is a flowchart decorated with sample dataset values for illustrating sample methods of matching datasets according to embodiments.

The matching of datasets, and the creation of the set 165 of matched values, according to embodiments are now described in more detail. FIG. 2 is a flowchart 212 for a matching method, for determining whether the second dataset 162 is compatible with the first dataset 161. Many of the operations of flowchart 212 are shown decorated with the first values and the second values of the first dataset 161 and the second dataset 162 respectively.

According to an operation 271, these two datasets are tentatively matched based on their opposite polarity values. Indeed, first value 241 is POS, while second value 251 is the opposite NEG.

According to another operation 272, these two datasets are tentatively further matched based on their certificate code values being the same. Indeed, first value 242 is PR, and second value 252 is also PR. As such, for the example of FIG. 2, the matched value set would include PR.

One more operation 274 looks for a strike number that is within both the first numerical acceptable range and the second numerical acceptable range. For this, first value 244 R1 and second value 254 R2 are consulted. Looking for such a strike number is shown graphically with a brief reference to FIG. 1, where a horizontal axis 108 is used. The first range RG1 and the second range RG2 are plotted with reference to the axis 108. They do overlap, and a strike number SX is found within the overlapping range, and added to the set 165 of matched values, along with the common certificate code value PR. In this example, the strike number SX is chosen to be at the middle of the overlapping range, although that is not necessary.

Returning to FIG. 2, according to one more operation 275 of the flowchart 212, it is determined whether or not a compatible strike number was found. If the answer is no, then according to a next operation 276, a different dataset pairing is tried, without success in matching the first dataset 161 and the second dataset 162.

If at the operation 275 the answer is yes (as it was in FIG. 1) then, according to a further operation 273, a matched size number MS can be determined. For this, first value 243 S1 and second value 253 S2 are consulted. Seen briefly in FIG. 1, the matched size number MS has been added to the set 165 of matched values.

Returning to FIG. 2, in embodiments, the matched size number MS is chosen to be the smaller of the two numbers S1, S2. For instance, the first size number S1 can be larger than the second size number S2, and the matched size number MS could equal the second size number S2, or vice versa.

Then, according to one more operation 277 of the flowchart 212, the first dataset 261 and the second dataset 262 become matched, which can be designated as is suitable. Then, according to another operation 278, a first resource may be determined, as described later in this document.

Returning to FIG. 1, it will be observed that the matching has been performed at a strike number SX that is within both the first acceptable range and the second acceptable range. Further, the matching has been performed for a matched size number MS of units that is not larger than the first size number S1 and the second size number S2.

In embodiments, one or more resources 179 may be involved, after being determined. For instance, a first resource for the first dataset 161 may be input responsive to establishing the matching. Another possible resource is an estimated first resource for the first dataset 161. The estimated first resource can be determined or computed responsive to receiving the first dataset, even before establishing the matching. In some embodiments, the estimated first resource serves as an earlier-provided estimate of the first resource, as it is determined before the matching. Of course, it may turn out that the inputted first resource is the same as the estimated first resource, for example in instances where the matched size number equals the first size number.

The first resource and the estimated second resource can have a numerical non-zero value, or even a zero value if there is an override by a precedence rule, as described below. Similarly, and as will be seen below, there can also be a second resource and an estimated second resource for the second dataset 162.

In some embodiments, these resources are determined or computed by the computer system 195, natively. As described later in more detail, in other embodiments these resources are determined or computed by a specialist facility. The specialist facility can be part of the OSP 198, or part of a remote Online Assisting Platform (OAP) that offers the determination or computation as a service to the OSP 198.

Whether provided natively or from a specialist facility, the one or more resources can be determined or computed from digital rules 170, and also from one or more of the first values of the first dataset 161, the second values of the second dataset 162, or from the matched values of the set 165.

In embodiments, one of the resources 179 may be determined for the first or the second dataset, by the computer system applying a certain digital main rule. In the example of FIG. 1, one of the resources 179 is determined for the dataset 161, by the computer system 195 applying the certain M_RULE6 176, as indicated by the arrow 178.

The following description is for native determination or computation of resources 179. The same description applies also to a specialist facility that provides these as a service, whether part of the OSP 198, or part of an OAP.

In embodiments, stored digital main rules may be accessed by the computer system 195. These digital main rules can be also simply called main rules, or just rules, depending on context. These digital main rules are digital in that they are implemented for use by software. For example these rules may be implemented within programs 131 and data 138. The data portion may be alternately implemented in memories in other places, which can be accessed via the network 188.

In this example, three sample digital main rules are shown explicitly, namely M_RULE5 175, M_RULE6 176, and M_RULE7 177. These are part of digital rules 170, which also include two sample digital precedence rules P_RULE2 172 and P_RULE3 173. The digital rules 170 may include additional rules, as suggested by the vertical dot-dot-dots.

In embodiments, a certain one of the digital main rules may be identified from among the accessed stored rules by the computer system 195. In particular, values of the dataset 161 can be tested, according to arrows 171, against logical conditions of the digital main rules, as described later in this document. In this example, the certain M_RULE6 176 is thus identified, which is indicated also by the beginning of an arrow 178 that is described in more detail later in this document. Identifying may be performed in a number of ways, and depending on how the digital main rules are implemented. An example is now described.

Figure 3:
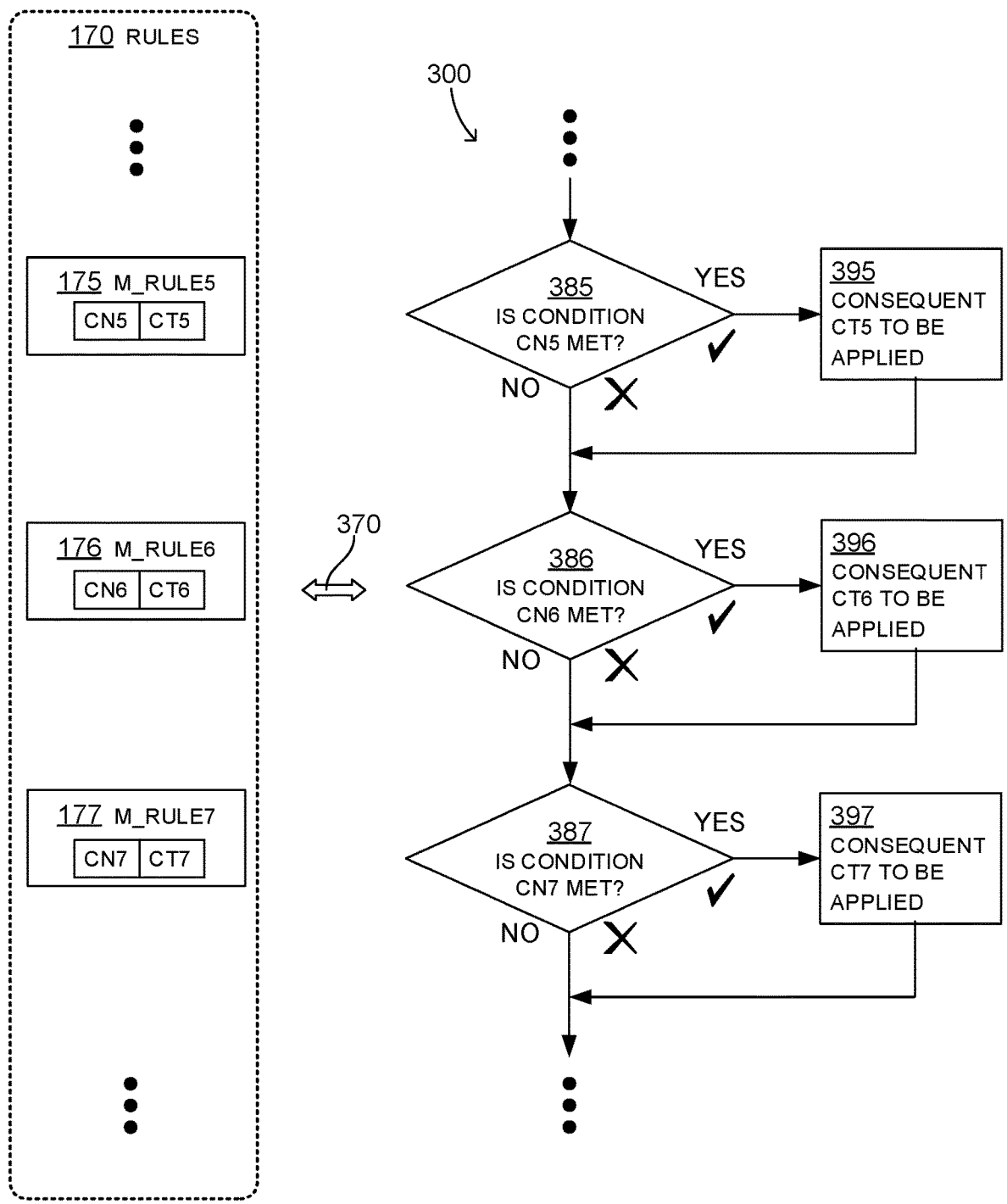
FIG. 3 repeats digital main rules of FIG. 1 in more detail, and juxtaposes them with a flowchart portion for a sample method of how it may be recognized that conditions of certain digital main rules can be met for their consequents to be applied, all according to embodiments.

Referring now also to FIG. 3, some of the digital main rules of digital rules 170 are repeated from FIG. 1 in more detail. In addition, according to an arrow 370, these digital main rules are shown juxtaposed with a flowchart portion 300. In embodiments, some of the digital main rules can be expressed in the form of a logical "if-then" statement, such as: "if P then Q". In such statements, the "if" part, represented by the "P", is called the condition, and the "then" part, represented by the "Q", is called the consequent. Therefore, at least some of the digital main rules include respective conditions and respective consequents associated with the respective conditions. And, for a certain digital main rule, if its certain condition P is met, its certain consequent Q is what happens or becomes applied. In this example, the digital main rules M_RULE5 175, M_RULE6 176, and M_RULE7 177 of FIG. 1, include respective conditions CN5, CN6, CN7, and respective consequents CT5, CT6, CT7 that are associated with the respective conditions CN5, CN6, CN7.

In embodiments, therefore, identifying is performed by recognizing, by the computer system 195, that a certain condition of a certain one of the accessed digital main rules is met by the least one of the first values or the second values. An example is shown by flowchart portion 300 of FIG. 3. According to successive decision diamonds 385, 386, 387, it is inquired whether or not conditions CN5, CN6, CN7 are met, respectively. If the answer is NO, also shown by a cross-out mark, then execution may proceed to the next diamond. If the answer is YES, also shown by a check mark, then, according to operations 395, 396, 397, it is further determined that the respective consequents CT5, CT6, CT7 are to be applied, and then execution may proceed to the next diamond in the flowchart portion. A consequent that is to be applied could be, for example, flagged as TRUE.

From what was mentioned in connection with FIG. 1, the certain M_RULE6 176 was thus identified. With reference to FIG. 3, the identification may have happened at operation 386 of the flowchart portion 300, at which time it was recognized that condition CN6 was met by a value of the dataset 161. This made: the condition CN6 be the certain condition, the digital main rule 176 be the certain digital main rule, and the consequent CT6 be the certain consequent of the certain digital main rule. Therefore, according to operation 396, consequent CT6 is what happens or becomes applied, as described elsewhere in this document. In embodiments, therefore one of the resources 179 is determined for the dataset 161, by the computer system 195 applying the certain M_RULE6 176, and in particular its certain consequent CT6. In fact, sometimes applying the consequent is more simply stated as "applying the rule".

A number of examples are possible. For instance, the certain condition could define a boundary of a region within a space. The region could be geometric, and be within a larger space. The region could be geographic, within the space of a city, a state, a country, a continent or the earth. The boundary could be defined in terms of numbers according to a coordinate system within the space. In the example of geography, the boundary could be defined in terms of groups of longitude and latitude coordinates. In such embodiments, the certain condition could be met responsive to the locus, determined from the entity value, being within the region instead of outside the region. For instance, the locus information could be one or more numbers or an address, or longitude and latitude. The condition can be met depending on how the one or more numbers compare with the boundary. For example, the comparison may reveal that the location is within the region instead of outside the region. The comparison can be made by rendering the locus information in units comparable to those of the boundary. For example, the locus information could be an address that is rendered into longitude and latitude coordinates, and so on.

The above embodiments are only examples, and not limiting. For instance, the example of FIG. 3 suggests that there is a 1:1 correspondence of the conditions with the associated consequents, but that is not necessary. In fact, a single consequent may be associated with two or more conditions, and two or more consequents may be associated with a single condition. Of course, all such can be shown as additional rules, with groups of them having the same condition or consequent.

For another instance, once it is determined that a consequent is to be applied, execution may even exit the flowchart portion 300. Or, it may be determined that more than one of the digital main rules are to be applied.

Where more than one of the digital main rules are found that could be applied, there are additional possibilities. For instance, the computer system 195 of FIG. 1 may further access at least one stored digital precedence rule, such as P_RULE2 172 or P_RULE3 173. Accordingly, the certain digital main rule may be thus identified also from the digital precedence rule. In particular, the digital precedence rule may arbitrate which one or more of the digital main rules is to be applied. To continue the previous example, if a value of the dataset 161 that characterizes a location, and the location is within multiple overlapping regions according to multiple rules, the digital precedence rule may decide that all of them are to be applied, or less than all of them are to be applied. Equivalent embodiments are also possible, where digital precedence rules are applied first to limit the iterative search of the flowchart portion 300, so as to test the applicability of fewer than all the rules according to arrows 171.

Accordingly, any one of the resource(s) 179 may be determined in a number of ways. For example, the certain consequent can be thus applied to one of the first values of the first dataset 161, the second values of the second dataset 162, or the matched values of the set 165. For instance, the certain consequent may indicate a percentage, directly, or the percentage can be stored in a place indicated by the certain rule, and so on. In addition, one of the resources 179 can be determined by multiplying the percentage with the first size number, the second size number, the matched size number, the strike price, a combination of them such as a product of them, and so on. As such, one of these resources 179 can have a non-integer value.

In embodiments, data of digital main rules are stored in the form of at least one look-up table. As such, one or more look-up tables may implement digital rules. Sample such tables are now shown, for various embodiments.

FIG. 4A shows a look-up table 401 that provides classifications of certificate codes. A column 411 shows various sample certificate codes, and column 412 shows their sample classifications as certificate types.

FIG. 4B shows a look-up table 470 that implements digital main rules according to embodiments, using the table 401. A column 414 shows various certificate types, which may have been derived from the table 401 in response to a certificate code. A column 415 shows polarities of various datasets. Taken together, columns 414 and 415 show conditions, while a column 419 shows corresponding consequents. These consequents are percentages that are to be applied to a product of the matched size number times MS the strike number SX of FIG. 1.

For embodiments, the certificate code value of a dataset, looked up from column 411 may be first categorized according to column 412. Then one or more resources can be determined from the look-up table 470.

In embodiments, the location of user 192 can make a difference. For example, the percentages may be different depending on locus information of the user 192. An example is now described.

Figure 5:
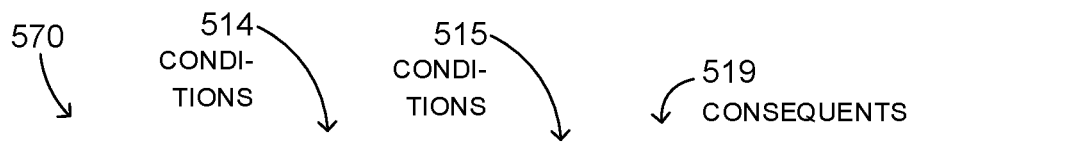
FIG. 5 shows a sample look-up table that implements digital main rules according to embodiments.

FIG. 5 shows a look-up table 570 that implements digital main rules according to embodiments. A column 514 shows possible locus information for user 192. A column 515 shows polarities of various datasets. Taken together, columns 514 and 515 show conditions, while a column 519 shows corresponding consequents. These consequents are percentages that are to be applied to a product of the matched size number times the strike number. In this case, the recognizing of which rule and which consequent to apply is performed responsive to the certain condition of the rule, i.e. the exact row, being met by the locus information of the user 192.

In embodiments, one or more notifications can be caused to be transmitted by the computer system. In the example of FIG. 1, such a notification 136 can be caused to be transmitted by the computer system 195. The transmission can be responsive to inputting the first resource, or other events. For example, the transmission can be responsive to computing the estimated first resource, in which case the notification can be called a preliminary notification.

One such notification 136 can be about an aspect of the resource(s) 179. In particular, the notification 136 may inform about the aspect of the resource 179, namely that it has been determined, where it can be found, what it is or a statistic derived from it, and so on. In some embodiments, the notification includes the certificate code value. In some embodiments, the notification includes a sum of the resource plus a product of the strike number times the matched size number. The shape of the resource(s) 179 is shown as not entirely within the shape of the notification 136 because, in some instances, only an aspect of the resource(s) 179 is communicated by the notification 136.

One or more such notifications can be transmitted to an output device or another device. The output device may be the screen of a local user or a remote user. The notification 136 may thus cause a desired image to appear on the screen, such as within a Graphical User Interface (GUI) and so on.

The other device can be the remote client device, from which the dataset 161 was received, as in the example of FIG. 1. In particular, the computer system 195 causes the notification 136 to be communicated by being encoded as a payload 137, which is carried by a response 187. The response 187 may be transmitted via the network 188 responsive to the received request 184. The response 187 may be transmitted to the computer system 190, and so on. As such, the other device can be the computer system 190, or the screen 191 of the user 192, and so on. In this example the single payload 137 encodes the entire notification 136, but that is not required, similarly with what is written above about encoding datasets in payloads.

In some instances, the other device is a designated device that is not controlled by the user 192 of the first remote client device, or by a user of the computer system 195. In other words, that designated device may belong to an Other Entity 159 that is entirely unrelated to the entity 193 and to the OSP 198. For instance, a formal notification about an aspect of the first resource can be caused to be transmitted to that designated device, the formal notification distinct from the preliminary notification and other notifications. Or, the computer system 195 can further create a document that includes an aspect of one of the resources, and cause the document to be transmitted via the network to that designated device.

Figure 6:
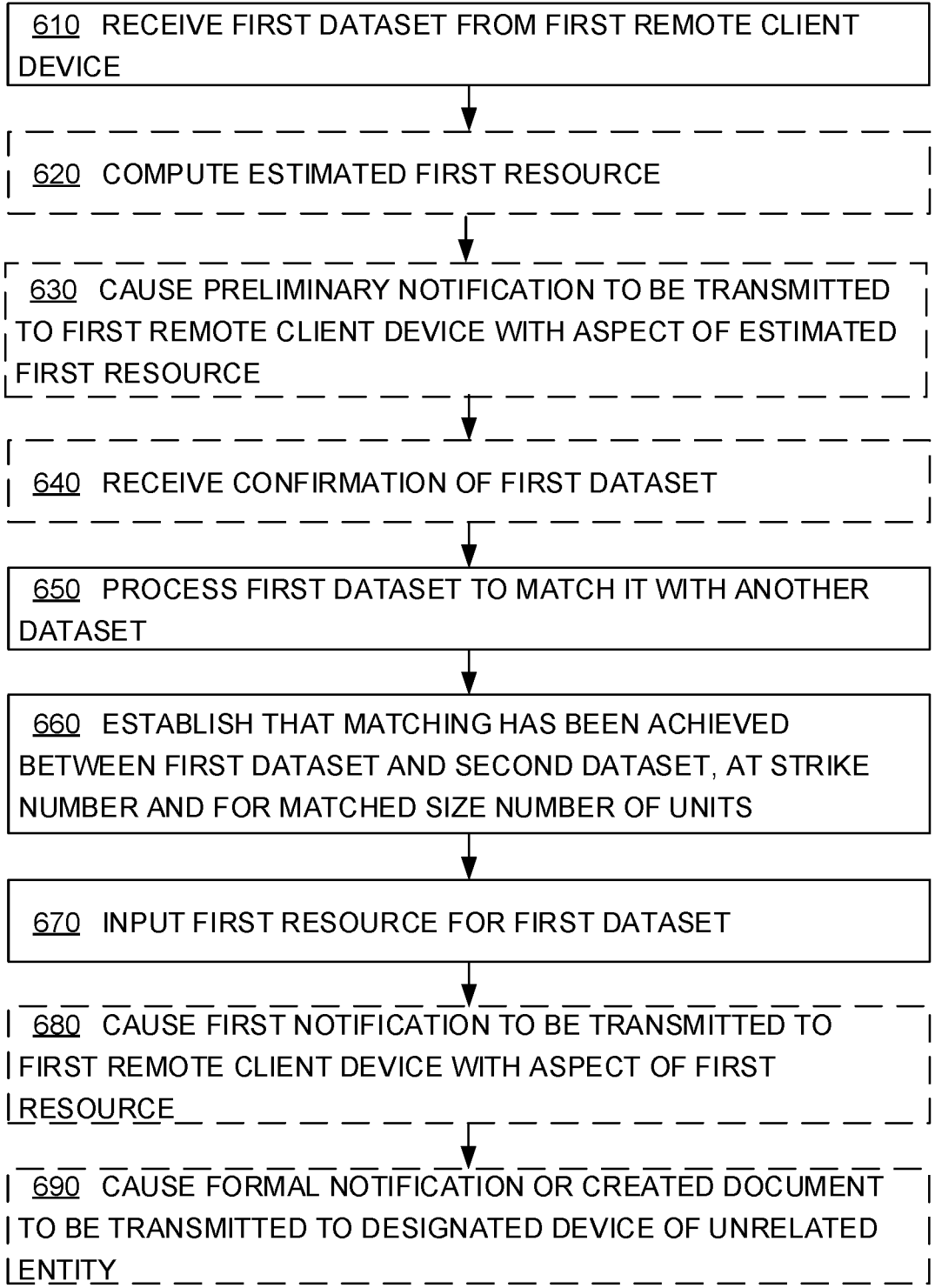
FIG. 6 is a flowchart for illustrating sample methods according to embodiments.

FIG. 6 shows a flowchart 600 for describing methods according to embodiments. According to a first operation 610, a first dataset may be received by a computer system of an online software platform (OSP) via a network from a first remote client device. Such a first dataset may be, for example, the above-described dataset 161, received from a remote client device 190.

According to another, optional operation 620, an estimated first resource may be computed, by the computer system, for the first dataset. Operation 620 may be performed responsive to receiving the first dataset of operation 610. Such an estimated first resource is described elsewhere in this document, also with reference to resource(s) 179.

According to another, optional operation 630, a preliminary notification can be caused to be transmitted, by the computer system, to the first remote client device. Sample such notifications 136 are described elsewhere in this document.

According to another, optional operation 640, a confirmation of the first dataset may be received by the computer system from the first remote client device. In embodiments, the user 192 will enter the confirmation in screen 191 upon receiving the preliminary notification, and assenting to it.

According to another operation 650, the first dataset may be processed by the computer system, and responsive to the receiving the confirmation of operation 640. The processing may be so as to match the first dataset with another dataset that is compatible with the first dataset. As will be seen, processing may be to determine whether the matching will be performed internally within the computer system, or externally by exporting the first dataset to another entity for getting it matched.

According to another operation 660, it may be established, by the computer system and responsive to the processing of operation 650, that matching has been achieved between the first dataset and a second dataset. Such a second dataset can be dataset 162, which is compatible with the first dataset 161, per the above. Different ways of establishing per the operation 660 are described later in this document.

According to another operation 670, a first resource may be input, by the computer system, for the first dataset. The first resource may be input responsive to establishing the matching of operation 660. Such a first resource is described elsewhere in this document, also with reference to resource(s) 179. As seen elsewhere in this document, the first resource may be input after it is determined natively within the computer system, or imported. If determined natively the first resource may be inputted, for example in internal memory registers, responsive to the first resource being determined by the computer system.

According to another operation 680, a first notification can be caused to be transmitted by the computer system to the first remote client device via the network. The first notification can be caused to be transmitted responsive to the inputting of operation 670. Sample such notifications 136 are described elsewhere in this document.

According to another, optional operation 690, a formal notification can be caused to be transmitted by the computer system via the network to a designated device of an unrelated entity, as described above. Sample such notifications 136 are described elsewhere in this document. The formal notification can be an email, a text message, and so on. It can even be a document that is created, and which includes an aspect of the first resource, and is caused to be transmitted to the designated device.

In some embodiments, operation 690 takes place only if the user 192 has enabled it from settings. Examples are now described.

Figure 7:
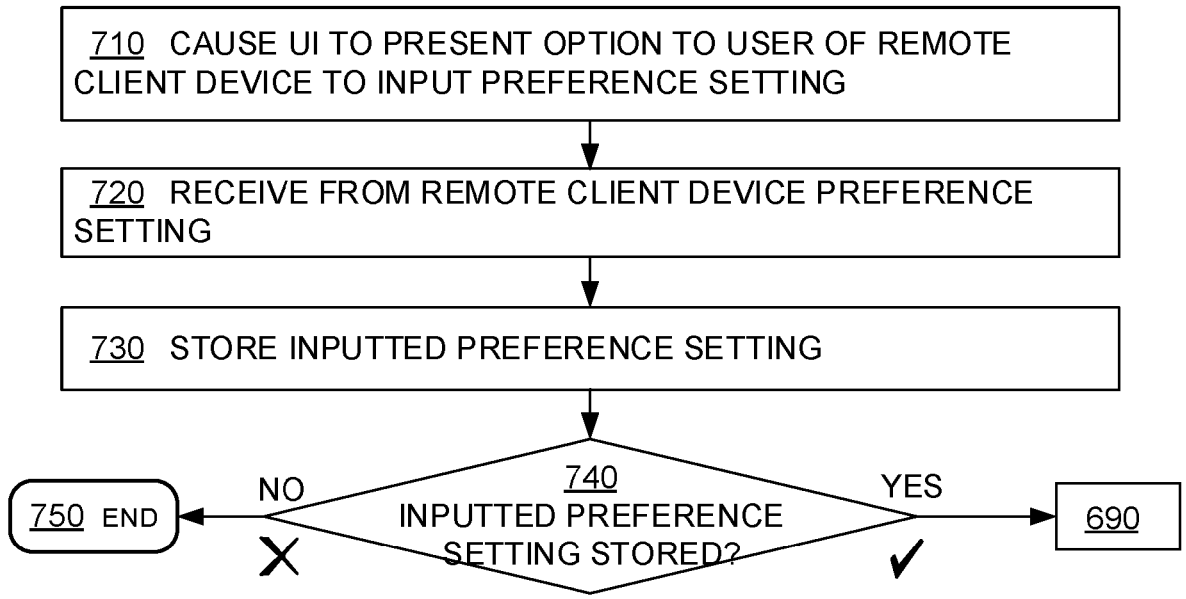
FIG. 7 is a flowchart portion for illustrating sample methods for user settings according to embodiments.

FIG. 7 shows a flowchart 700 for describing methods according to embodiments. According to a first operation 710, a user interface can be caused to present an option to a user of a first remote client device to input a preference setting.

Figure 8:
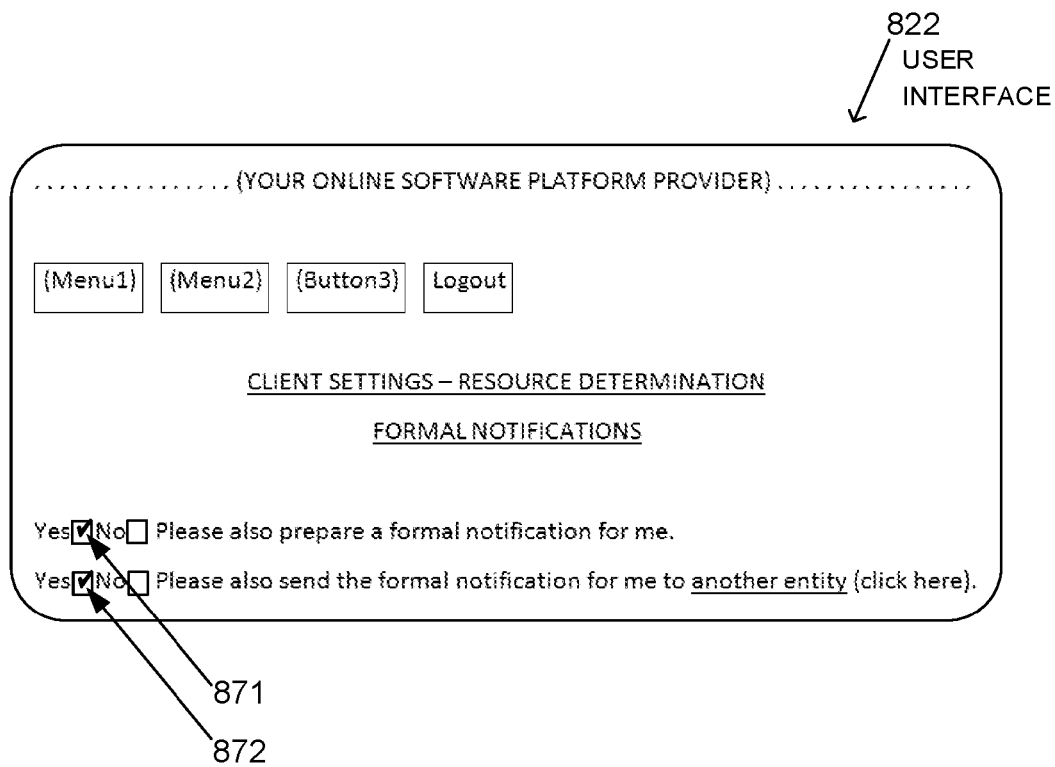
FIG. 8 is a diagram of a sample settings User Interface (UI) for one of the operations of FIG. 7.

Referring briefly to FIG. 8, a user interface (UI) 822 is shown, which can be caused by the computer system 195 to be presented on the screen 191. The UI 822 enables the user 192 to input two preference settings, by presenting options as boxes that can be checked. As can be seen, boxes 871, 872 have been checked, for shown preferences. The last line also presents a link with an option for follow-up, potentially presenting more information to the user and giving them further options to designate or confirm the other entity. In embodiments, the user of the first remote client device may designate the designated device, and so on. In other embodiments, the computer system 195 may designate the designated device, for example by designating the entity whose device is the designated device, and so on.

Returning to FIG. 7, according to another, optional operation 720, a preference setting may be received from the first remote client device, the preference setting inputted from the presented option.

According to another, optional operation 730, the inputted preference setting is stored. Storing can be in memory 138.

According to another, optional operation 740, it may be determined whether or not the inputted preference setting has been stored. If yes, then the previously mentioned operation 690 is indeed performed. If no, the process ends at operation 750 without performing the operation 690. In other words, in such embodiments the formal notification or the document is caused to be transmitted to the designated device per the operation 690 only if the inputted preference setting has been stored.

As already mentioned, resources may be determined or computed for either a single unmatched dataset 161 or 162, or for a matched values set after matching. In some embodiments, the determination of one or more of the resource(s) 179 is outsourced. Examples are now described.

Figure 9:
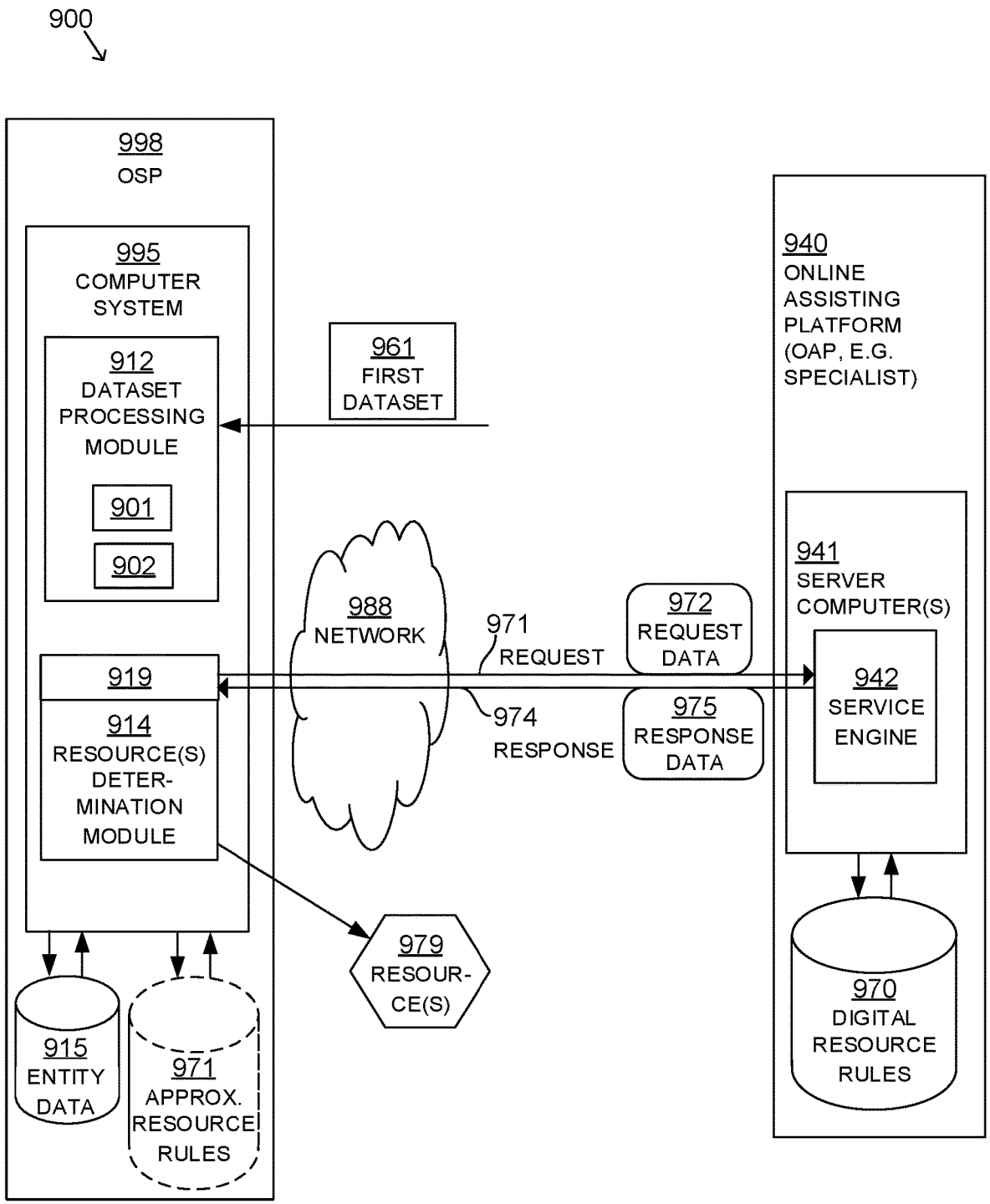
FIG. 9 is a diagram of a sample arrangement of entities and components for an Online Software Platform (OSP) to import a determination of a resource online from a specialist facility according to embodiments.

FIG. 9 is a diagram of a sample arrangement 900, in which an OSP 998 imports a determination of a resource from an Online Assisting Platform (OAP) 940 that is a specialist facility. The OAP 940 has at least one or more server computers 941 that implement a service engine 942. The OAP 940 also has a memory 970, which may be implemented as a database, and stores digital resource rules. The service engine 942 may query the memory 970 for determining a resource. Querying can be to fetch digital rules and rates, and the memory 970 can respond by supplying these rules and rates. In addition, the OAP 940 may have additional memory (not shown), for storing data of transactions and resources computed or determined, in the event that reporting of resources is to happen long after the fact, e.g. periodically only.

The OSP 998 has a computer system 995, similarly with the computer system 195 of OSP 198. In this example, the OSP 998 also has a memory 915, which can be implemented as a database. The memory 915 may store entity data, which can be data of its clients such as entity 193 and user 192, e.g. by storing entity values.

The computer system 995 has a dataset processing module 912, which may perform operation 650 of FIG. 6. In this example, the dataset processing module 912 is shown receiving a first dataset 961 for this purpose. The dataset processing module 912 includes a dataset matching module 901, and a dataset routing module 902, whose operation is described later in this document.

The computer system 995 also has a resource(s) determination module 914. In general, the module 914 determines or computes one or more resources 979, either internally or by outsourcing the task. The resource(s) 979, which can be as the resource(s) 179, are thus available to the remainder of the computer system 995. The OSP 998 optionally also has a memory 971, which may be implemented as a database, and stores digital resource rules at least in their approximate form. As such, module 914 may query memory 971 when only an approximate estimate is needed, such as an estimated first resource.

In this example, module 914 outsources the determination to OAP 940 via an OSP application ("app") 919, for which examples are given later in this document. Briefly, the OSP application 919 transmits a request 971 via a network 988, which can be as network 188. The request 971 includes request data 972, which can be a payload and is also known as the request object. In some embodiments, the request 971 includes at least one of the first values of the first dataset 961, or at least one of the second values of a second dataset, if matching has been performed. The request 971 requests the determination of a resource. The request 971 is received by the service engine 942, which in turn determines the requested resource responsive to the request. Then the server computer(s) 941 send a response 974 responsive to the received request 971. The response 974 includes response data 975, which are the requested resource, or an aspect of it, and so on. For example, the aspect can be one of the percentage values of column 519, or the resource itself can be that percentage value multiplied by another number.

Figure 10:
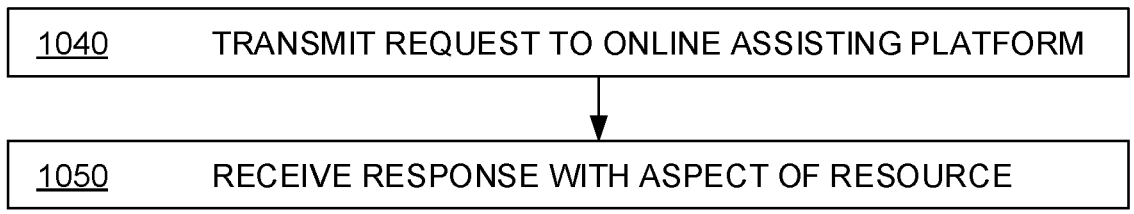
FIG. 10 is a flowchart portion for illustrating sample methods according to embodiments.

FIG. 10 shows a flowchart 1000 for describing methods according to embodiments for the arrangement 900. According to an operation 1040, a request 971 may be transmitted to an online assisting platform 940 by a computer system 995 via a network 188. According to another operation 1050, a response 974 may be received by the computer system 995 responsive to the request 971 from the online assisting platform 940. An aspect of the requested first resource may being inputted from the received response 974.

Returning to FIG. 9, the OSP application 919 maybe implemented in a number of ways. Two examples are now described.

Figure 11:
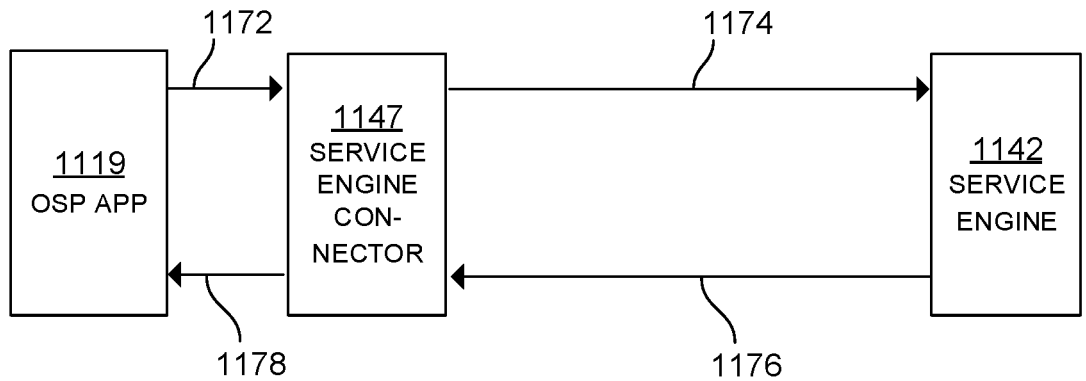
FIG. 11 is a diagram of a sample configuration according to embodiments for enabling a request and a response shown in FIG. 9.

FIG. 11 is a diagram of a sample configuration according to embodiments for enabling a request and a response shown in FIG. 9. The OSP application 919 is implemented by an OSP application 1119 that queries a service engine 1142 for the determination of a resource. The service engine 1142 can be as service engine 942, consult digital resource rules 970, and so on.

In FIG. 11, a service engine connector 1147 is a plugin that sits on top of the OSP application 1119. The connector 1147 is able to fetch (1172) and push (1174), in real time, datasets or portions of them, as needed for transmission. For every request, the connector 1147 fetches (1172) the required details, forms the request object and sends or pushes (1174) it to the service engine 1142 via a service call. The service engine 1142 determines the requested resource, and responds (1176) to the connector 1147. The connector 1147 reads the response forwards (1178) the aspect of the resource to the OSP app 1119.

Figure 12:
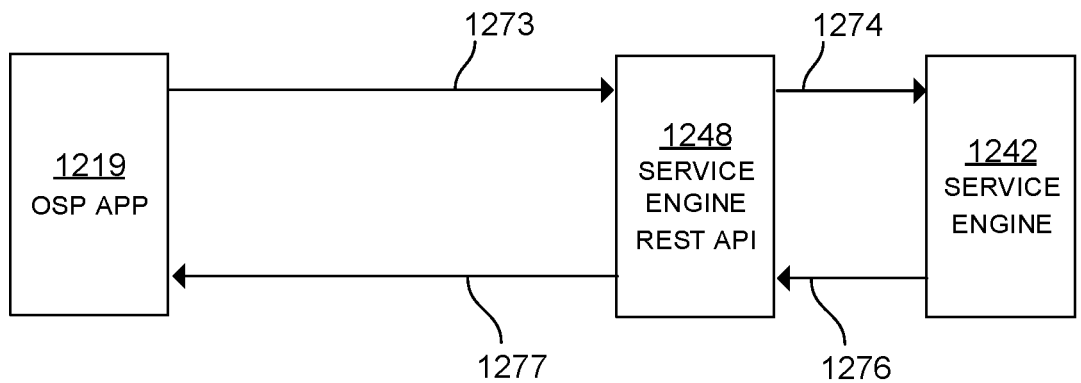
FIG. 12 is a diagram of another sample configuration according to embodiments for enabling a request and a response shown in FIG. 9.

FIG. 12 is a diagram of another sample configuration according to embodiments for enabling a request and a response shown in FIG. 9. The OSP application 919 is implemented by an OSP application 1219 that queries a service engine 1242 for the determination of a resource. The service engine 1242 can be as service engine 942, consult digital resource rules 970, and so on.

FIG. 12 provides an alternative flow if the OSP 998 does not want to use a Connector, but prefers to directly consume a REST API from their OSP app 1219. REST or RESTful (Representational State Transfer) API (Application Programming Interface) design is designed to take advantage of existing protocols. While REST can be used over nearly any protocol, it usually takes advantage of HTTP (Hyper Text Transfer Protocol) when used for Web APIs.

Accordingly, in FIG. 12, a service engine REST API 1248 is provided. The OSP application 1219 fetches internally the required data, forms the request object, and sends (1273) it to the REST API 1248. In turn, the REST API 1248 talks (1274) in background to the service engine 1242. The service engine 1242 determines the requested resource, and sends (1276) it back to the REST API 1248. In turn, the REST API 1248 sends (1277) the response to OSP's application to the OSP app 1219.

Returning to FIG. 9, the dataset processing module 912 may process the first dataset in different ways, regardless of whether or not it outsources the determination of the resources. Embodiments are now described.

In some embodiments multiple datasets are received, and there is an attempt to match them with each other first. In particular, beyond the first dataset, additional datasets may be received, by the computer system 195, 995 via the network 188, 988. In such embodiments, the processing of operation 650 includes selecting the second dataset 162 from the additional datasets, responsive to the second dataset meeting one or more compatibility criteria. A sample determination of that was shown in FIG. 2 of this document. Moreover, in such embodiments, the establishing of operation 660 is performed responsive to selecting the second dataset from the additional datasets. In such embodiments, what is done in the context of the first dataset may also happen for the second dataset. An example is now described.

Figure 13:
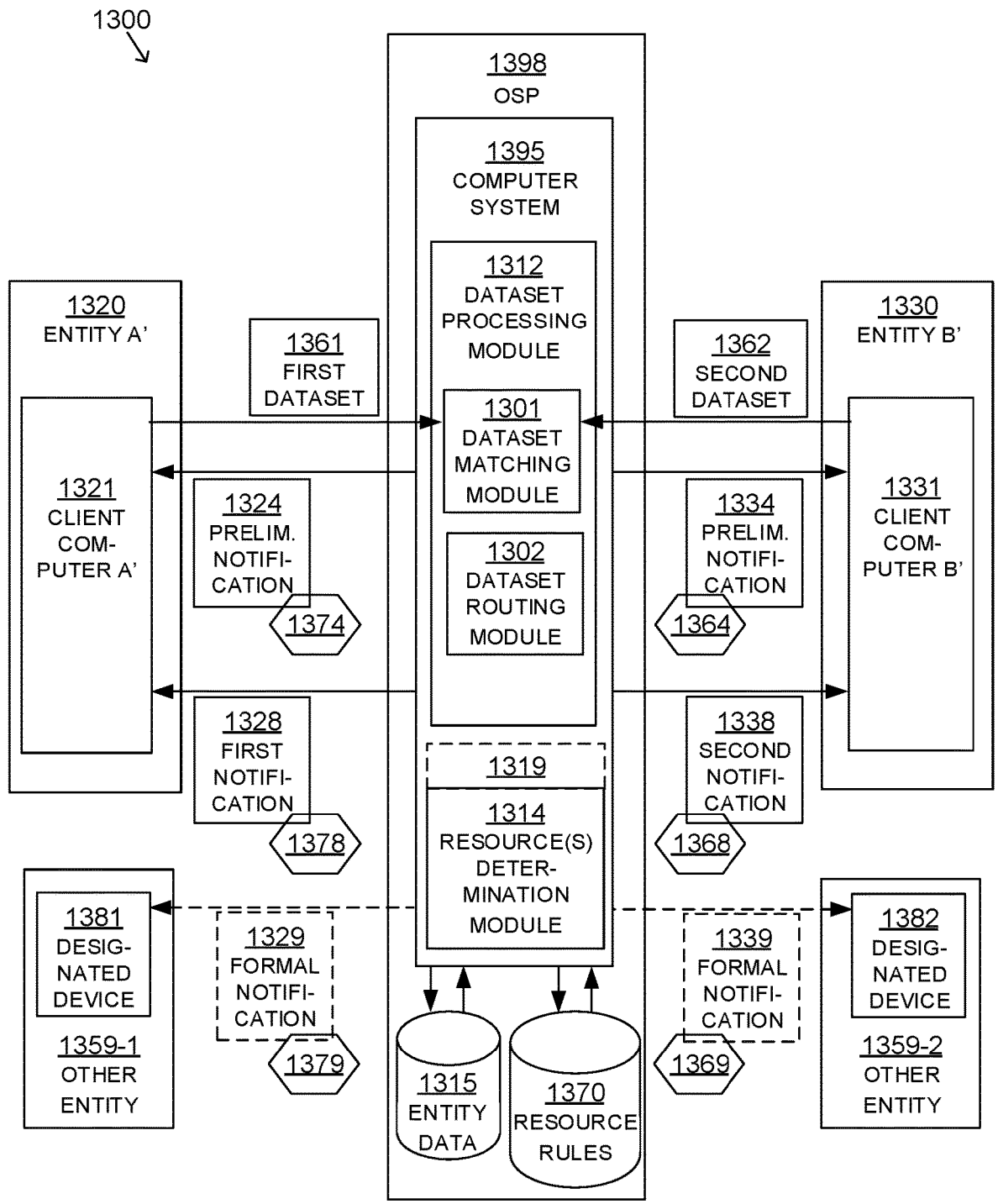
FIG. 13 is a diagram of a sample arrangement of entities and components according to embodiments, and in an operation where received datasets are matched internally.

FIG. 13 is a diagram of a sample arrangement 1300, where an OSP 1398 matches datasets internally. The OSP 1398 can be as the OSP 198, and has a computer system 1395 as the computer system 195. The OSP 1398 may also have a memory 1315, which can be implemented as the memory 915, storing similar types of data.

The computer system 1395 may have a resource(s) determination module 1314 similar to the resource(s) determination module 914. Optionally the computer system 1395 also has an OSP application ("app") 1319, which can be as described for the OSP app 919, for requesting remote determinations of resources. Optionally the computer system 1395 further has a memory 1370, similar to memory 970 or 971 for storing digital rules locally.

The computer system 1395 may also have a dataset processing module 1312, similar to what was described for the dataset processing module 912. The dataset processing module 1312 has a dataset matching module 1301 and a dataset routing module 1302.

The OSP 1398 has an Entity A' 1320 as a client. Entity A' may have a user (not shown). A client computer A' 1321 is associated with the Entity A' 1320 and/or its user. The OSP 1398 also has an Entity B' 1330 as a client. Entity B' may have a user (not shown). A client computer B' 1331 is associated with the Entity B' 1330 and/or its user.

In the example of FIG. 13, a first dataset 1361 is received from the first remote client computer A' 1321. Upon receipt, an estimated first resource 1374 may be determined for Entity A' 1320 and/or its user per operation 620, and a first preliminary notification 1324 may be sent to client computer A' 1321, e.g. per operation 630.

In addition, a second dataset 1362 is received from second remote client computer B' 1331. Upon receipt, an estimated second resource 1364 may be determined for Entity B' 1330 and/or its user per operation 620, and a second preliminary notification 1334 may be sent to client computer B' 1331, e.g. per operation 630.

The two received datasets 1361, 1362 are processed by module 1312 for matching, e.g. per operation 650. In the example of FIG. 13, the two received datasets 1361, 1362 are thus sent to the dataset matching module 1301, where they are found compatible and are successfully matched, for example per method 212.

Once it has been established that the two received datasets 1361, 1362 have been matched, e.g. per operation 660, a first resource 1378 is input for the first dataset 1361, and a first notification 1328 is caused to be transmitted to the client computer A' 1321.

And, in some embodiments, an Other Entity 1359-1 may be involved, which has and controls a designated device 1381. As such, the designated device 1381 is not controlled by a user of the first remote client device, namely anyone in the Entity A' 1320 that controls the client computer A' 1321. In addition, the designated device 1381 is not controlled by a user of the computer system 1395, namely anyone of the OSP 1398 that controls the computer system 1395. The designated device 1381 may be a computer system as any of the computer systems described in this document. The computer system 1395 may cause a formal notification 1329 to be transmitted via the network to the designated device 1381, the formal notification 1329 being about an aspect 1379 of the first resource 1378.

And, again, what is done in the context of the first dataset 1361 may also happen for the second dataset 1362. For example, a second resource 1368 may be input by the computer system 1395 for the second dataset 1362, the second resource 1368 having a numerical value that is determined also from the strike price. In addition, the computer system 1395 may cause a second notification 1338 to be transmitted about an aspect of the second resource 1368 to the second remote client device, namely client computer B' 1331. Furthermore, the computer system 1395 may cause a formal notification 1339 to be transmitted about an aspect 1369 of the second resource 1368 to a designated device 1382 that is controlled by an Other Entity 1359-2, and not by anyone of the OSP 1398 that controls the computer system 1395, or by a user of the second remote client device, namely anyone in Entity B' 1330 that controls the client computer B' 1331. The Other Entity 1359-2 can be the same or different than the Other Entity 1359-1.

The second resource may be determined in the same ways as the first resource, for example by the computer system itself natively, or by requesting the resource determination from another system. The second resource may equal the first resource, and so on.

Sometimes the computer system 195, 995, 1395 matches the first dataset 161, 961, 1361 by outsourcing it. This may be performed automatically, or only upon failing to match the first dataset with another, compatible dataset for a certain time. In that case, the computer system 995, 1395 uses its dataset routing module 902, 1302. An example is now described.

Figure 14:
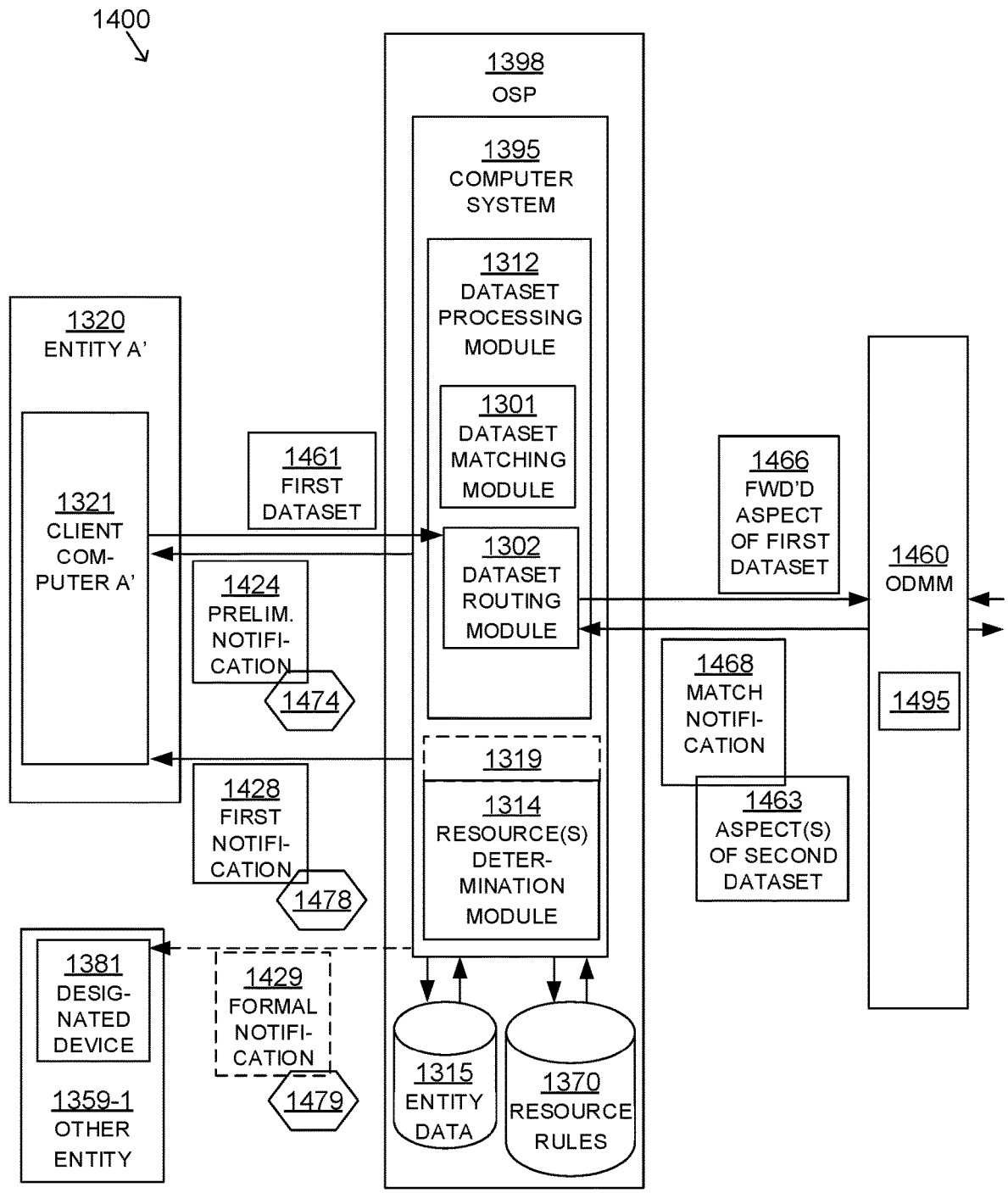
FIG. 14 is a diagram of the sample arrangement of entities and components of FIG. 13, and in an operation where matching a received dataset is outsourced.

FIG. 14 is a diagram of a sample arrangement 1400, where the OSP 1398 of FIG. 13 matches a received dataset by outsourcing it. In fact, in FIG. 14 the OSP 1398 has the same Entity A' 1320 as a client, but not the Entity B' 1330.

In the example of FIG. 14, a first dataset 1461 is received from the first remote client computer A' 1321. Upon receipt, an estimated first resource 1474 may be determined for the Entity A' 1420 and/or its user. Accordingly, a first preliminary notification 1424 may be sent to client computer A' 1321.

The received dataset 1461 is processed by module 1312 for matching, e.g. per operation 650. In the example of FIG. 14, the received dataset 1461 is thus sent to the dataset routing module 1302.

In some embodiments, the processing of operation 650 includes forwarding, by the computer system 195, 995, 1395 via the network 188, an aspect of the first dataset 1461 to an online dataset matching module (ODMM) 1460. The forwarding, in the example of FIG. 14, is performed by the dataset routing module 1302. In this example, the forwarded aspect 1466 may contain enough of the values of the received dataset 1461 for purposes of enabling the ODMM to match, but not necessarily other values, and so on.

In such embodiments, the matching is performed by the ODMM 1460. In particular, the ODMM 1460 may receive a forwarded aspect of a second dataset (not shown) from another computer system (not shown), and then match them. Then, in response to the forwarding, the ODMM 1460 may transmit, and the computer system 1395 may receive, an aspect 1463 of the second dataset as part of a match notification 1468. In such embodiments, the establishing of operation 660 may be performed by the computer system 195, 995, 1395 responsive to receiving the aspect 1463 of second dataset.

Once it has been established that the received dataset 1361 has been matched, then a first resource 1478 is input for the first dataset 1461, and a first notification 1428 is caused to be transmitted to the client computer A' 1321.

It will be further recognized that, while the methods of flowchart 600 may be performed by the computer systems 195, 995 and 1395, they may also be performed by a computer system 1495 of ODMM 1460. This applies, as the forwarded aspect 1466 of the first dataset 1461 can be considered to be, for purposes of the computer system 1495, a first dataset received remotely, the computer system 1395 can be considered to be a remote client device from the point of view of the computer system 1495, and so on. As such, the ODMM 1460 may determine or compute resources, return them, etc.

And, in some embodiments, the same Other Entity 1359-1 may be involved. The computer system 1395 may cause a formal notification 1429 to be transmitted via the network to the designated device 1381, the formal notification 1429 being about an aspect 1479 of the first resource 1478.

In some embodiments, additional unrelated entities are involved. Formal notifications may be sent to each of them. An example is now described.

Figure 15:
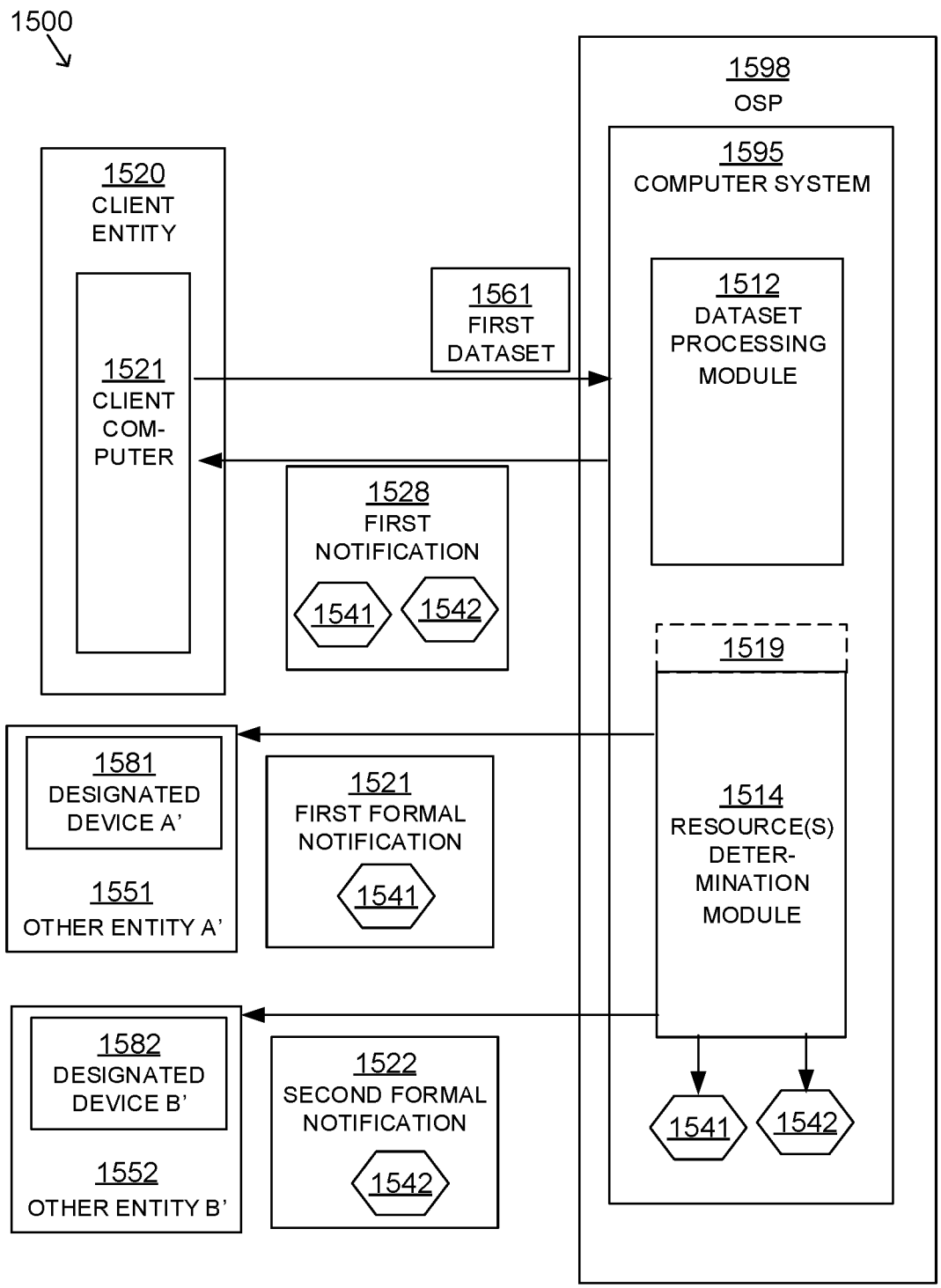
FIG. 15 is a diagram of a sample arrangement of entities and components for describing sample embodiments of notifications and their contents.

FIG. 15 is a diagram of a sample arrangement 1500, where an OSP 1598 receives datasets for matching. For this diagram, it does not matter how the datasets are matched. The OSP 1598 can be as the OSP 198, and has a computer system 1595 as the computer system 195. The computer system 1595 may have a resource(s) determination module 1514 similar to the resource(s) determination modules 914, 1314. Optionally the computer system 1595 also has an OSP application ("app") 1519, which can be as described for the OSP app 919, for requesting remote determinations of resources. The computer system 1595 may also have a dataset processing module 1512, similar to what was described for the dataset processing module 912.

The OSP 1598 has an Client Entity 1520 as a client. The Client Entity 1520 may have a user (not shown). A client computer 1521 is associated with the Client Entity 1520 and/or its user.

In addition, an Other Entity A' 1551 has and controls a designated device A' 1581. As such, the designated device 1581 is not controlled by a user of the first remote client device, namely anyone in the Client Entity 1520 that controls the client computer 1521. In addition, the designated device A' 1581 is not controlled by a user of the computer system 1595, namely anyone of the OSP 1598 that controls the computer system 1595. The designated device A' 1581 may be as the designated device 1381.

Moreover, an Other Entity B' 1552 has and controls a designated device B' 1582. As such, the designated device 1582 is not controlled by a user of the first remote client device, namely anyone in the Client Entity 1520 that controls the client computer 1521. In addition, the designated device B' 1582 is not controlled by a user of the computer system 1595, namely anyone of the OSP 1598 that controls the computer system 1595. In addition, the designated device B' 1582 is not controlled by a user of the first designated device A' 1581, namely anyone of the Other Entity A' 1551 that controls a designated device A' 1581. The designated device B' 1582 may be as the designated device 1381.

In the example of FIG. 15, a first dataset 1561 is received from client computer 1521, remotely through a network.

As also mentioned previously, a first resource 1541 may be input for the first dataset 1561. For example, the resource(s) determination module 1514 may determine or compute the first resource 1541, or outsource it. This is why a first instance of the first resource 1541 appears within the computer system 1595. Then a first formal notification 1521 is caused, by the computer system 1595, to be transmitted via the network. The first formal notification 1521 encodes the first resource 1541, is why a second instance of the first resource 1541 appears within the first formal notification 1521. The first formal notification 1521 is thus caused to be transmitted to the first designated device A' 1581.

In addition, a supplemental resource 1542 may be input for the first dataset 1561. The supplemental resource 1542 may be computed or computed from the digital main rules, either directly or by outsourcing, as controlled by the resource(s) determination module 1514. This is why a first instance of the supplemental resource 1542 appears within the computer system 1595. Then a second formal notification 1522 is caused, by the computer system 1595, to be transmitted via the network. The second formal notification 1522 encodes the supplemental resource 1542, which is why a second instance of the supplemental resource 1542 appears within the second formal notification 1522. The second formal notification 1522 is thus caused to be transmitted to the second designated device B' 1582.

As also mentioned previously, a first, but not formal, notification 1528 can be caused, by the computer system 1595, to be transmitted via the network to the Client Computer 1521. In some of these embodiments, the first notification 1528 encodes the first resource 1541 and the supplemental resource 1542. This is why a third instance of the first resource 1541 and a third instance of the supplemental resource 1542 appear within the computer system 1595. In some of these embodiments, the supplemental resource 1522 has a numerical non-zero value, and the first notification 1528 encodes a sum of the first resource 1541 and the supplemental resource 1542.

Figure 16:
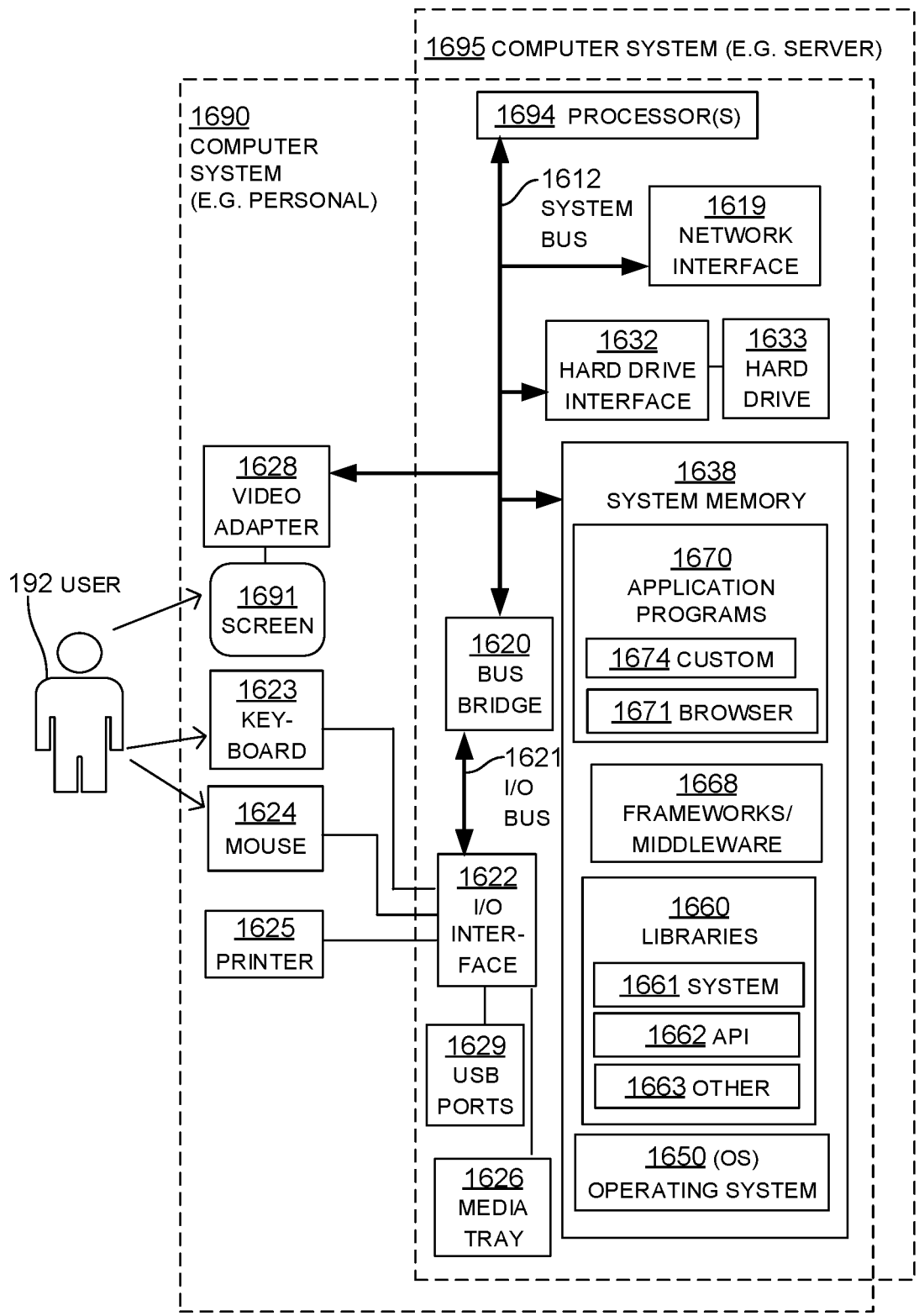
FIG. 16 is a block diagram showing additional components of sample computer systems according to embodiments.

FIG. 16 shows details for a sample computer system 1695 and for a sample computer system 1690. The computer system 1695 may be a server, while the computer system 1690 may be a personal device, such as a personal computer, a desktop computer, a personal computing device such as a laptop computer, a tablet computer, a mobile phone, and so on. Either type may be used for the computer systems 195 and 190 of FIG. 1.

The computer system 1695 and the computer system 1690 have similarities, which FIG. 16 exploits for purposes of economy in this document. It will be understood, however, that a component in the computer system 1695 may be implemented differently than the same component in the computer system 1690. For instance, a memory in a server may be larger than a memory in a personal computer, and so on. Similarly, custom application programs 1674 that implement embodiments may be different, and so on.

The computer system 1695 includes one or more processors 1694. The processor(s) 1694 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 1694 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 1695, or the computer system 1690, are not intended to be exhaustive. Rather, they are representative, for highlighting essential components that can be used with embodiments.

The computer system 1695 also includes a system bus 1612 that is coupled to the processor(s) 1694. The system bus 1612 can be used by the processor(s) 1694 to control and/or communicate with other components of the computer system 1695.

The computer system 1695 additionally includes a network interface 1619 that is coupled to system bus 1612. Network interface 1619 can be used to access a communications network, such as the network 188. Network interface 1619 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 1695 also includes various memory components. These memory components include memory components shown separately in the computer system 1695, plus cache memory within the processor(s) 1694. Accordingly, these memory components are examples of non-transitory machine-readable media. The memory components shown separately in the computer system 1695 are variously coupled, directly or indirectly, with the processor(s) 1694. The coupling in this example is via the system bus 1612.

Instructions for performing any of the methods or functions described in this document may be stored, completely or partially, within the memory components of the computer system 1695, etc. Therefore, one or more of these non-transitory computer-readable media can be configured to store instructions which, when executed by one or more processors 1694 of a host computer system such as the computer system 1695 or the computer system 1690, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 1695 include a non-volatile hard drive 1633. The computer system 1695 further includes a hard drive interface 1632 that is coupled to the hard drive 1633 and to the system bus 1612.

The memory components of the computer system 1695 include a system memory 1638. The system memory 1638 includes volatile memory including, but not limited to, cache memory, registers and buffers. In embodiments, data from the hard drive 1633 populates registers of the volatile memory of the system memory 1638.

In some embodiments, the system memory 1638 has a software architecture that uses a stack of layers, with each layer providing a particular functionality. In this example the layers include, starting from the bottom, an Operating System (OS) 1650, libraries 1660, frameworks/middleware 1668 and application programs 1670, which are also known as applications 1670. Other software architectures may include less, more or different layers. For example, a presentation layer may also be included. For another example, some mobile or special purpose operating systems may not provide a frameworks/middleware 1668.

The OS 1650 may manage hardware resources and provide common services. The libraries 1660 provide a common infrastructure that is used by the applications 1670 and/or other components and/or layers. The libraries 1660 provide functionality that allows other software components to perform tasks more easily than if they interfaced directly with the specific underlying functionality of the OS 1650. The libraries 1660 may include system libraries 1661, such as a C standard library. The system libraries 1661 may provide functions such as memory allocation functions, string manipulation functions, mathematical functions, and the like.

In addition, the libraries 1660 may include API libraries 1662 and other libraries 1663. The API libraries 1662 may include media libraries, such as libraries to support presentation and manipulation of various media formats such as MPREG4, H.264, MP3, AAC, AMR, JPG, and PNG. The API libraries 1662 may also include graphics libraries, for instance an OpenGL framework that may be used to render 2D and 3D in a graphic content on the screen 1691. The API libraries 1662 may further include database libraries, for instance SQLite, which may support various relational database functions. The API libraries 1662 may additionally include web libraries, for instance WebKit, which may support web browsing functionality, and also libraries for applications 1670.

The frameworks/middleware 1668 may provide a higher-level common infrastructure that may be used by the applications 1670 and/or other software components/modules. For example, the frameworks/middleware 1668 may provide various Graphic User Interface (GUI) functions, high-level resource management, high-level location services, and so forth. The frameworks/middleware 1668 may provide a broad spectrum of other APIs that may be used by the applications 1670 and/or other software components/modules, some of which may be specific to the OS 1650 or to a platform.

The application programs 1670 are also known more simply as applications and apps. One such app is a browser 1671, which is a software that can permit the user 192 to access other devices in the internet, for example while using a Graphic User Interface (GUI). The browser 1671 includes program modules and instructions that enable the computer system 1695 to exchange network messages with a network, for example using Hypertext Transfer Protocol (HTTP) messaging.

The application programs 1670 may include one or more custom applications 1674, made according to embodiments. These can be made so as to cause their host computer to perform operations according to embodiments. Of course, when implemented by software, operations according to embodiments may be implemented much faster than may be implemented by a human mind; for example tens or hundreds of such operations may be performed per second according to embodiments, which is much faster than a human mind can do.

Other such applications 1670 may include a contacts application, a book reader application, a location application, a media application, a messaging application, and so on. Applications 1670 may be developed using the ANDROID™ or IOS™ Software Development Kit (SDK) by an entity other than the vendor of the particular platform, and may be mobile software running on a mobile operating system such as IOS™, ANDROID™, WINDOWS® Phone, or other mobile operating systems. The applications 1670 may use built-in functions of the OS 1650, of the libraries 1660, and of the frameworks/middleware 1668 to create user interfaces for the user 192 to interact with.

The computer system 1695 moreover includes a bus bridge 1620 coupled to the system bus 1612. The computer system 1695 furthermore includes an input/output (I/O) bus 1621 coupled to the bus bridge 1620. The computer system 1695 also includes an I/O interface 1622 coupled to the I/O bus 1621.

For being accessed, the computer system 1695 also includes one or more Universal Serial Bus (USB) ports 1629. These can be coupled to the I/O interface 1622. The computer system 1695 further includes a media tray 1626, which may include storage devices such as CD-ROM drives, multi-media interfaces, and so on.

The computer system 1690 may include many components similar to those of the computer system 1695, as seen in FIG. 16. In addition, a number of the application programs may be more suitable for the computer system 1690 than for the computer system 1695.

The computer system 1690 further includes peripheral input/output (I/O) devices for being accessed by a user more routinely. As such, the computer system 1690 includes a screen 1691 and a video adapter 1628 to drive and/or support the screen 1691. The video adapter 1628 is coupled to the system bus 1612.

The computer system 1690 also includes a keyboard 1623, a mouse 1624, and a printer 1625. In this example, the keyboard 1623, the mouse 1624, and the printer 1625 are directly coupled to the I/O interface 1622. Sometimes this coupling is via the USB ports 1629.

In this context, "machine-readable medium" refers to a component, device or other tangible media able to store instructions and data temporarily or permanently and may include, but is not limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing. The machine that would read such a medium includes one or more processors 1694.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

OPERATIONAL EXAMPLES—USE CASES

The above-mentioned embodiments have one or more uses. Operational examples and sample use cases are now described.

Embodiments can be helpful for online stock brokers (OSBs), online market makers, online Electronic Communications Networks (ECNs) and others to serve their clients' needs in conducting transactions of buying and selling securities, such as stocks, bonds, options, etc., while at the same time helping with preparing the payment of taxes for these transactions. In particular, such entities receive buy and sell orders online from their clients, whether the clients are individuals or intermediaries, and try to match them internally for completing a transaction. If not, they may outsource the matching to others.

For applying the embodiments to such use cases, what was written above for users, applies to traders; for datasets, applies to orders for trading securities; for certificate codes, applies to securities' names or trading symbols; for resources, applies to taxes; for Other Entities, applies to tax authorities that impose the taxes; and for formal notifications, applies to tax returns intended for filing with the tax authorities.

Figure 17:
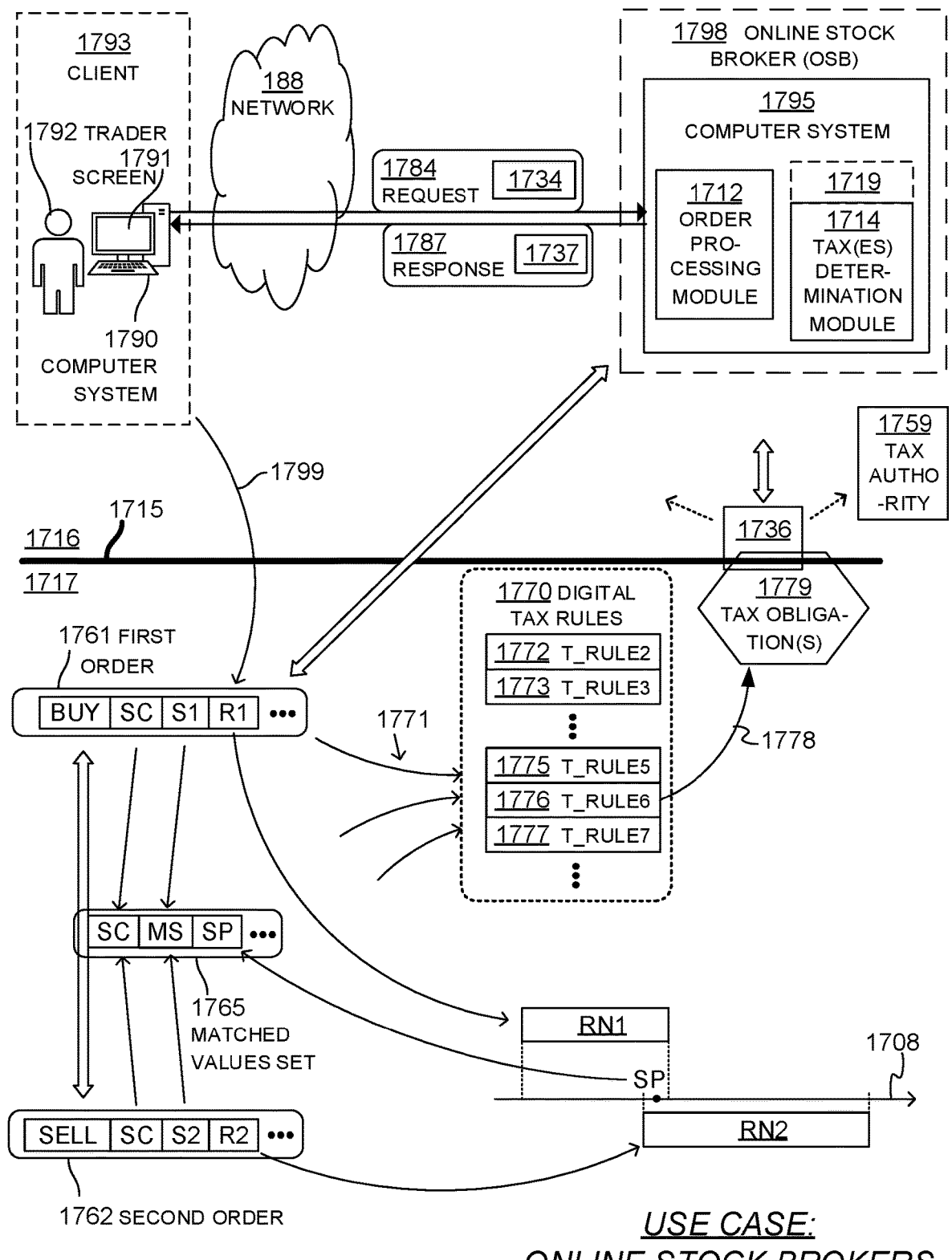
FIG. 17 is a diagram of a sample aspects for describing operational examples and use cases of online stock brokers performing trades online, and further computing tax that is assessed on the purchase and sale of securities.

FIG. 17 is a diagram for how online stock brokers may use embodiments. Much of FIG. 17 is also applicable, by extension, to market makers and ECNs. It will be recognized that aspects of FIG. 17 have similarities with aspects of FIG. 1. Portions of such aspects may be implemented as described for analogous aspects of FIG. 1. In particular, a thick line 1715 separates FIG. 17, although not completely or rigorously, into a top portion 1716 and a bottom portion 1717. The top portion 1716 emphasizes mostly entities, components, their relationships, and their interactions, while the bottom portion 1717 emphasizes mostly processing of data that takes place often within one or more of the components in the top portion 1716.

In the top portion 1716, a platform for an online stock broker is shown as OSB 1798. The OSB has a client 1793, who has registered with the OSB 1798, established credentials, and so on. The human aspect of the client 1793 is a trader 1792, who may use a computer system 1790 that has a screen 1791. The trader 1792 thus goes online, via the OSB 1798, to trade stocks, bonds and options.

Within the OSB 1798 there is a computer system 1795, which is used to help customers, such as a trader 1792, with their trades, and also with tax compliance arising from their trades. Further in this example, the computer system 1795 of the OSB 1798 is implemented as a Software as a Service (SaaS), for being accessed by the trader 1792 online.

The computer system 1795 has an order processing module 1712, which can be as described above for the dataset processing module 912. The computer system 1795 may have a tax(es) determination module 1714, which can be as described above for the resource(s) determination module 914. Optionally the computer system 1795 also has an OSB application ("app") 1719, which can be as described for the OSP app 919, for requesting remote determinations of taxes if desired.

The computer system 1795 may have additional functionalities, for example a database for storing the client data, a memory for storing digital tax rules if a determination of taxes is to take place natively, and so on.

Taxes on transactions of stock trades may be imposed by jurisdictions, and administered by a tax authority 1759 of the jurisdiction. In addition, such a tax authority may require reporting of taxes, e.g. by filing returns, and paying, i.e. remittances, of the tax amounts due.

Digital tax rules 1770 may be generated according to embodiments so as to accommodate what rules various tax authorities administer within the boundaries of their tax jurisdictions. In FIG. 17 five sample digital tax rules are shown, namely T_RULE2 1772, T_RULE3 1773, T_RULE5 1775, T_RULE6 1776 and T_RULE7 1777. Additional digital tax rules 1770 are suggested by the vertical dot-dot-dots. Similarly with FIG. 1, some of these digital tax rules may be digital main rules that can be used to determine tax obligation(s) 1779, while others can be digital precedence rules that can be used to determine which of the digital main rules are to be applied in the event of conflict among rules. In some use cases, the digital main rules may be about the transaction tax due, for example at a certain percentage of the purchase or sale price of securities. The digital precedence rules may be rules that can manage exceptions such as temporary tax holidays, exemptions, and so on. For example, those who transact in government bonds may be exempt from paying taxes for such transactions.

Similarly with FIG. 1, these digital tax rules 1770 can be implemented or organized in different ways. In some use cases they can be organized with conditions and consequents, such as was described earlier in this document. Such conditions may relate to geographical boundaries, effective dates, and so on, for determining where and when a digital tax rule is to be applied. These conditions may be expressed as logical conditions with ranges, dates, other data, and so on.

Figure 18:
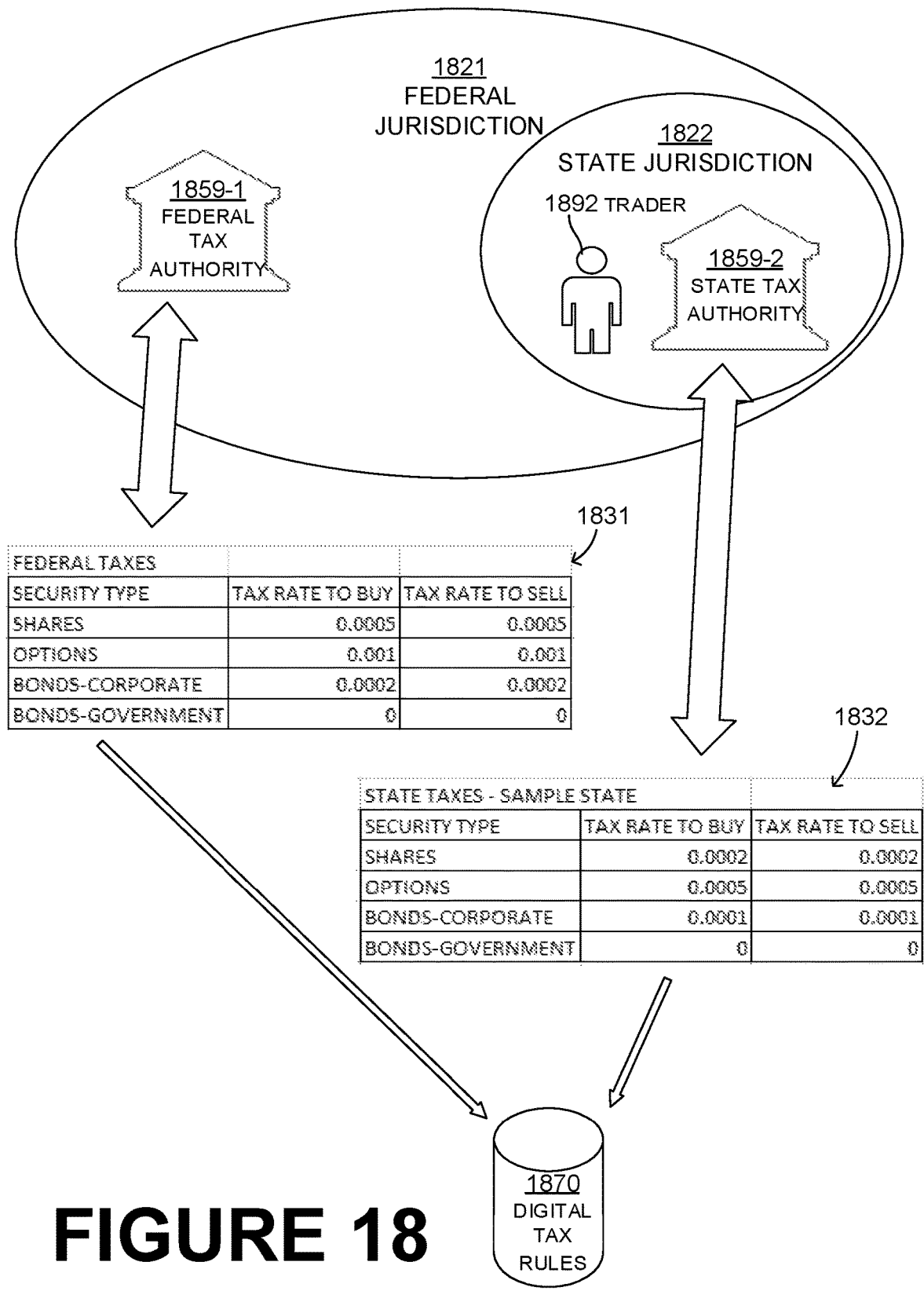
FIG. 18 shows sample jurisdictions with their tax authorities, and sample stored look-up tables for implementing digital tax rules for determining taxes for these jurisdictions according to embodiments.

Examples of tax authorities are now given in more detail. FIG. 18 shows a Federal jurisdiction 1821, which can be the jurisdiction of the U.S.A. For instance, the icon 1821 could represent boundaries on a geographic map, or other boundaries within a space to delineate where the jurisdiction extends to. A Federal tax authority 1859-1 administers taxes imposed by the Federal jurisdiction 1821. A look-up table 1831 implements digital tax rules for the Federal jurisdiction 1821.

FIG. 18 also shows a State jurisdiction 1822, which can be the jurisdiction of a State such as California. A State tax authority 1859-2 administers taxes imposed by the State jurisdiction 1822. A look-up table 1832 implements digital tax rules for the Federal jurisdiction 1821.

It will be recognized that the early columns of the look-up tables 1831 and 1832 list conditions, while the right-most column lists consequents. A memory 1870, which can be implemented as a database, may store the digital tax rules of implemented by look-up table 1831 and the look-up table 1832.

A trader 1892 may be subject to both the Federal jurisdiction 1821 and the State jurisdiction 1822, based on their location, their address, etc. As such, the trader 1892 may pay taxes for their transaction to both the Federal tax authority 1859-1 and the State tax authority 1859-2.

Returning to FIG. 17, the OSB 1798 may learn the location, address, etc. of trader 1792, at the time that the trader 1792 on-boards with the computer system 1795, uploads their data, and so on. At that time, the computer system 1795 my offer or demand that the trader 1792 establish their settings for their tax obligations. An example is now described.

FIG. 19 is a diagram of a sample settings User Interface (UI) 1922, which may appear on screen 1791 of FIG. 17. Similarly with FIG. 8, the UI 1922 of FIG. 19 enables the trader 1792 to adjust their personal preferences for service. In the example of FIG. 19, the trader 1792 has checked the YES boxes in three instances, namely 1971, 1972, and 1973.

Returning to FIG. 17, just below line 1715 a first order 1761 is shown. The first order 1761 has been received by the computer system 1795 as an order for a trade. In this example, the computer system 1790 transmits a request 1784 that includes a payload 1734, and the order 1761 is received by the computer system 1795 parsing the received payload 1734. In this example the single payload 1734 encodes the entire order 1761.

The first order 1761 is a dataset similar to what was described for the first dataset 161 of FIG. 1. It has first values, which can be numerical, alphanumeric, Boolean, and so on, as needed for characterizing the order. One or more one of these first values of the order 1761 may characterize an attribute of the client 1793, as indicated by an arrow 1799. (It should be noted that the arrow 1799 describes a correspondence, but not the journey of data in becoming the received order 1761.)

The first values of the order 1761 include a first polarity value that is BUY. The opposite would be SELL. These first values also include a trading symbol SC that identifies a certain security, such as a stock, a bond, an option, of a plurality of possible securities. These first values further include a first size number S1 that identifies a number of units of the certain security indicated by the trading symbol SC. These first values additionally include at least one first range value R1, although such ranges may be defined more easily with two or more values, such as a beginning and an end, or a single number and an indication that the number is a maximum or a minimum. In any event, the first range value R1, alone or together with another first value, may define a first numerical acceptable range of price for matching the first dataset 161. The price may be a maximum, a minimum, a tolerance for a "market" value, and so on.

There can be more first values that are not shown, as indicated by the horizontal dot-dot-dot in the order 1761. For example, one value could be for an identity of the first order 1761, so as to differentiate it from other such orders. Another value may be an entity value for the trader 1792 of the computer system 1790, which serves as the first remote client device 1790. In such instances, locus information of the trader 1792 can be determined from the entity value. For example, the locus information can be encoded in the entity value. Or, the entity value can encode an identity of the trader 1792, such as by a client serial number, a client record number and so on. In such a case, a stored record of the identity of the trader 1792 may contain the locus information. In such a case, the computer system 1795 may identify the stored record from the entity value, and thus look up the locus information from the identified record.

In embodiments, it can be established, by the computer system 1795, that matching has been achieved between the first order 1761 and a second order 1762. For the matching to have taken place, the second order 1762 must be compatible with the first order 1761. Compatibility may be determined by whether or not compatibility criteria are met between the first values of the first order 1761 and the second values of the second order 1762. In the example of FIG. 17, the matching is shown by a wide vertical arrow, and has produced a matched values set 1765. In particular, the second order 1762 can have second values, which can be analogous to the first values. In particular, the second values may include a second polarity value SELL. In addition, the second order 1762 may have a trading symbol SC that identifies the certain security that is identified by the trading symbol SC of the first order 1761. Plus the second order 1762 may have a second size number S2 that identifies a number of units of the certain security. And, the second order 1762 may have at least one second range value R2 that defines a second numerical acceptable range of price for matching the second order 1762. As with the first order 1761, the second range value R2 may do this alone or together with another second value.

The matched values set 1765 shows a matched size number MS, which can be the minimum of S1 and S2. It also shows a strike price SP, whose determination is shown graphically, where a horizontal axis 1708 is used. The first range RN1 and the second range RN2 are plotted with reference to the axis 1708. They do overlap, and the strike price SP is found within the overlapping range. In this example, the strike price SP is chosen to be at the middle of the overlapping range, although that is not necessary.

Once it is established that the orders have been matched, one or more tax obligations 1779 are determined from the digital tax rules 1770. In so doing, values of the first order 1761 can be tested against these logical conditions according to arrows 1771, similarly with what was shown in FIG. 3. In such cases, the consequents may indicate one or more tax obligations, such as to indicate different types of taxes that are due, rules, rates, exemption requirements, reporting requirements, remittance requirements, etc.

In this example, a certain digital tax rule T_RULE6 1776 is shown as identified, which is indicated also by the beginning of an arrow 1778. Identifying may be performed responsive to the values of the order 1761, which are shown as considered for digital tax rules 1770 by arrows 1771. These values may also include the applicable location of the trader 1792, with reference to tax jurisdictions, and so on.

As such, the computer system 1795 may make a determination of tax obligation(s) 1779, which is akin to determining the resource 179 of FIG. 1. The tax obligation 1779 can be determined by the OSB 1798 applying the certain digital tax rule T_RULE6 1776, as indicated by the arrow 1778. In this example, the consequent of the identified certain digital tax rule T_RULE6 1776 may specify that a transaction tax is due, and the amount is to be determined by a multiplication, by a specific rate, of the amount spent in executing a BUY order or the amount received in executing a SELL order.

The computer system 1795 may then cause a notification 1736 to be transmitted. The notification 1736 can be about an aspect of the tax obligation 1779, similarly with the notification 136 of FIG. 1. In the example of FIG. 17, the notification 1736 is caused to be transmitted by the computer system 1795 as an answer to the received order 1761. The notification 1736 can be about an aspect of the tax obligation 1779. In particular, the notification 1736 may inform about the aspect of the tax obligation 1779, namely that it has been determined, where it can be found, what it is or a statistic derived from it, and so on.

The notification 1736 can be transmitted to one of an output device and another device that can be the remote device, from which the order 1761 was received. The output device maybe the screen of a local user or a remote user. The notification 1736 may thus cause a desired image to appear on the screen, such as within a Graphical User Interface (GUI) and so on. The other device may be a remote device, as in this example. In particular, the computer system 1795 causes the notification 1736 to be communicated by being encoded as a payload 1737, which is carried by a response 1787. The response 1787 may be transmitted via the network 188 responsive to the received request 1784. The response 1787 may be transmitted to the computer system 1790, and so on. As such, the other device can be the computer system 1790, or the screen 1791 of the trader 1792, and so on. In this example the single payload 1737 encodes the entire notification 1736, but that is not required, similarly with what is written above about encoding datasets in payloads. Of course, along with the aspect of the tax obligation 1779, it is advantageous to embed in the payload 1737 an ID value and/or one or more values of the order 1761. This will help the recipient correlate the response 1787 to the request 1784, and therefore match the received aspect of the tax obligation 1779 as the answer to the received order 1761.

Various use cases are now described. It will be recognized that some may draw more explanation from analogous elements described earlier in this document.

Figure 20:
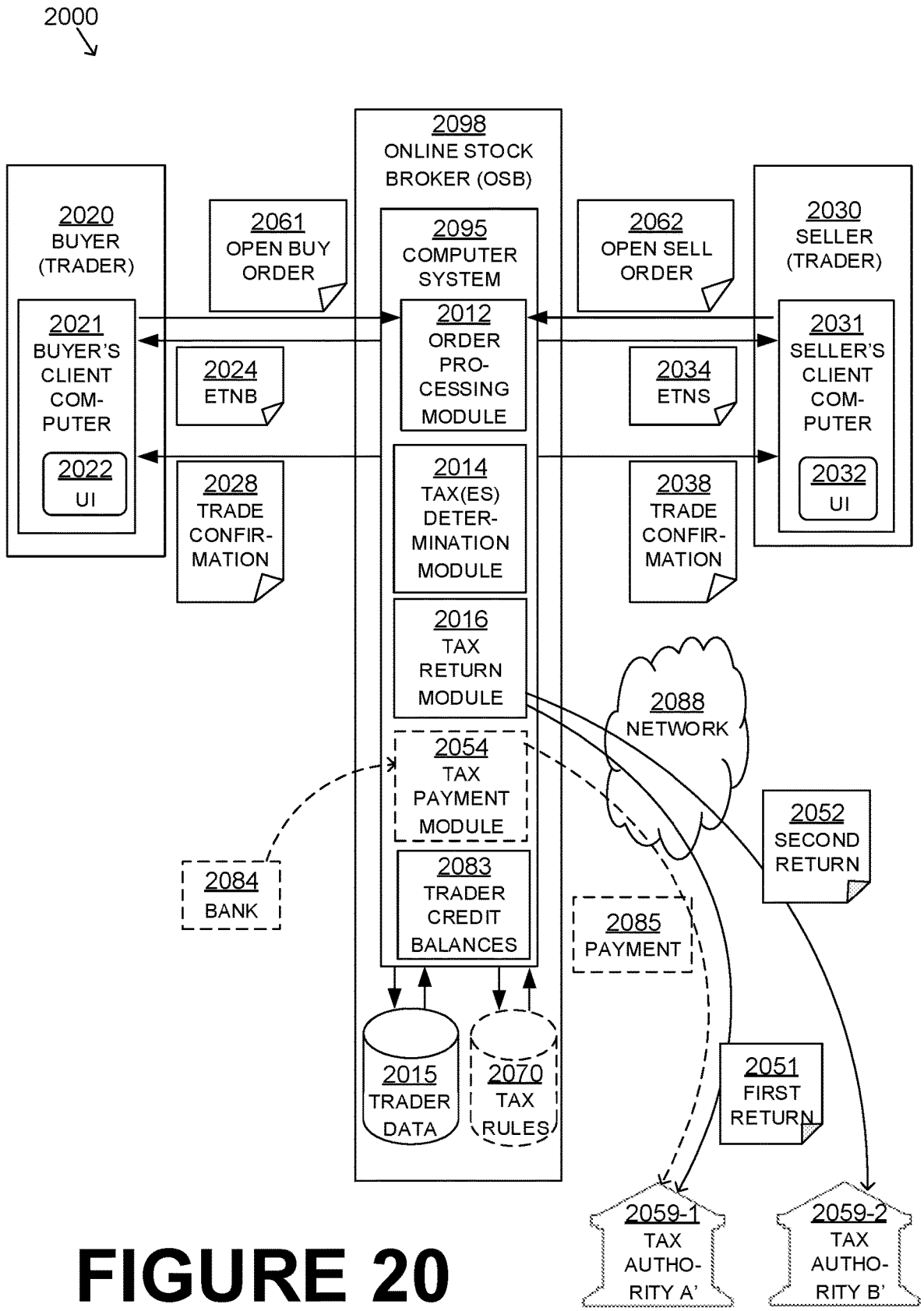
FIG. 20 is a diagram of a sample arrangement of entities and components for a use case where an online stock broker is operating in a mode of matching internally open buy and sell orders.

FIG. 20 is a diagram of a sample arrangement 2000, where an OSB 2098 is operating in a mode of matching orders internally. The OSB 2098 can be as the OSP 198, and has a computer system 2095 as the computer system 195.

The OSB 2098 may also have a memory 2015, which can be implemented as the memory 915, storing similar types of data for trader customers.

The computer system 2095 may have an order processing module 2012, similar to what was described for the order processing module 912, with an order matching module and an order routing module (neither of the latter shown).

The computer system 2095 may also have a tax(es) determination module 2014 similar to the resource(s) determination module 914. Taxes may be determined natively, or by outsourcing. Optionally the computer system 2095 further has a memory 2070, similar to memory 970 or 971 for storing digital rules locally.

The OSB 2098 has a Buyer 2020 as a client, who is a trader. The Buyer 2020 has a buyer's client computer 2021, which has a UI 2022. The OSB 2098 also has a Seller 2030 as a client, who is a trader. The Seller 2030 has a seller's client computer 2031, which has a UI 2032.

In the example of FIG. 20, a first open buy order 2061 is received from computer 2021. Upon receipt, an estimated first tax may be determined for Buyer 2020, and an Estimated Tax Notification to Buyer (ETNB) 2024 may be sent to computer 2021. The estimated first tax may appear on UI 2022.

In addition, a second open sell order 2062 is received from computer 2031. Upon receipt, an estimated second tax may be determined for Seller 2030, and an Estimated Tax Notification to Seller (ETNS) 2034 may be sent to 2031. The estimated second tax may appear on UI 2032.

The two received open orders 2061, 2062 are processed by module 2012 for matching. In the example of FIG. 20, the two received orders 2061, 2062 are found compatible and are successfully matched. After that, the open orders become closed, being updated with the matched values set 1765. A first tax is determined for the first closed order that is due by the buyer, and a trade confirmation 2028 is sent to computer 2021, reporting the entire trade and also the first tax. Also, a second tax is determined for the second closed order that is due by the seller, and a trade confirmation 2038 is sent to computer 2031, reporting the entire trade and also the second tax.

And, in some embodiments, a Tax Authority A' 2059-1 may be involved. The Tax Authority A' may have and control a designated device, which is not shown so as not to clutter the drawing. That designated device can be as the designated device 1381, and be accessible through a network 2088 that is as network 188.

Depending on the settings of FIG. 18, a tax return module 2016 may create a first return 2051 for the Buyer 2020, and even file it with the first Tax Authority A' 2059-1 on behalf of the Buyer 2020. Similarly, the tax return module 2016 may create a second return 2052 for the Seller 2030, and even file it with a second Tax Authority B' 2059-2 on behalf of the Seller 2030. Filing can be by transmitting the tax returns, similarly to what was described with formal notifications.

Moreover, and again depending on the settings of FIG. 18, a tax payment module 2054 may remit a payment 2085, for the tax owed, to the first Tax Authority A' 2059-1, or their indicated financial institution. Payment maybe made by ACH, wire, and so on. A credit notification can be caused to be transmitted to a financial institution of a governmental entity. These funds may come by adjusting accordingly the trader credit balances 2083, or withdrawn from a bank 2084 of the Buyer 2020 with prior authorization.

In other instances, the OSB 2098 does not match open orders internally, but instead operates in a mode of forwarding them to an Other Trading Entity (OTE), such as a Market Maker (MM) or an Electronic Communications Network (ECN). Some of the most popular ECNs have become actual exchanges, such as Archipelago NYSE (ARCA), BATS, EDGE, and INET/ISLD. An example is now described.

Figure 21:
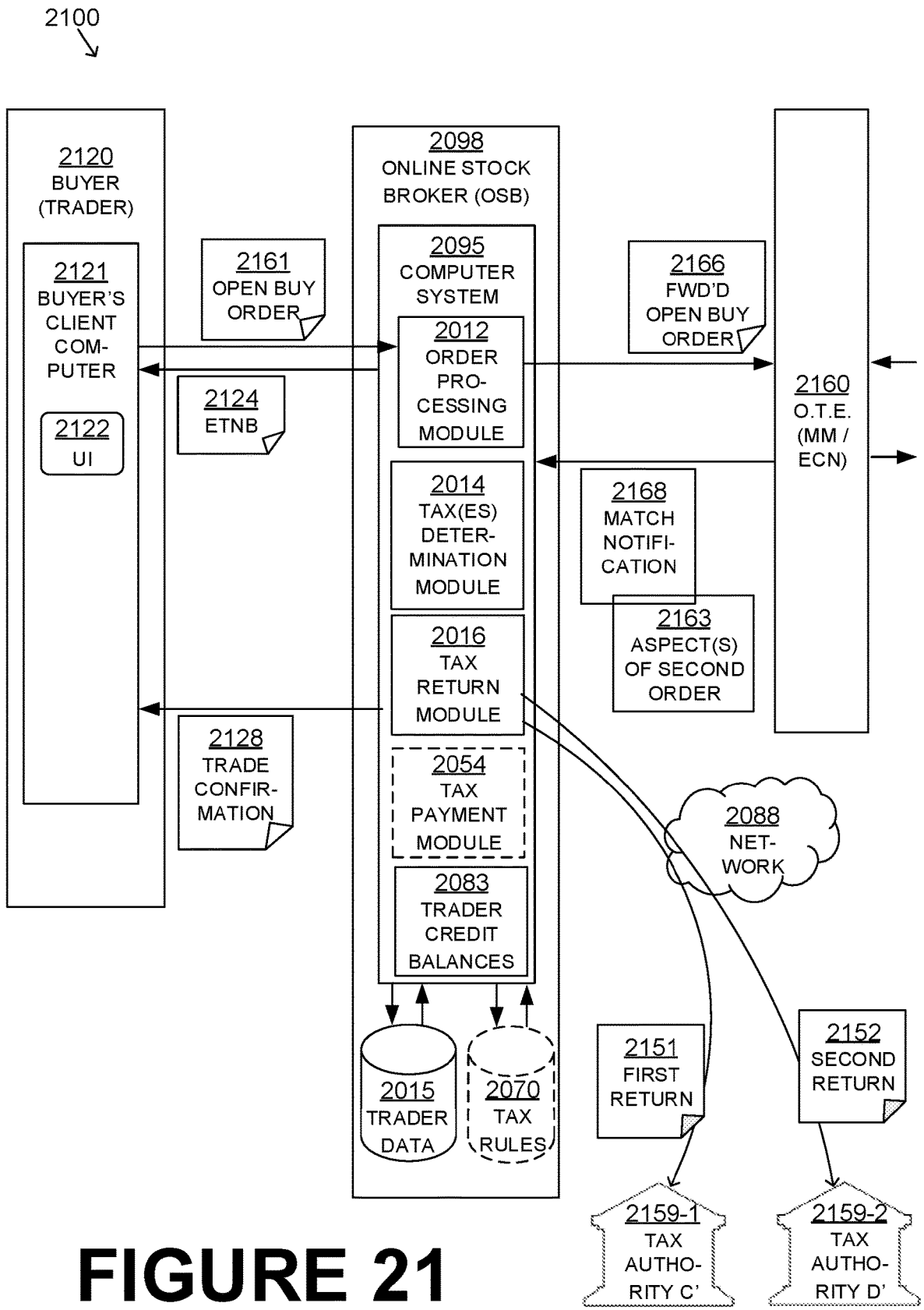
FIG. 21 is a diagram of a sample arrangement of entities and components for a use case where the online stock broker of FIG. 20 is instead operating in a mode of forwarding an open order to an outside entity for matching.

FIG. 21 is a diagram of a sample arrangement 2100, where the OSP 2098 of FIG. 20 matches a received order by outsourcing it. The OSB 2098 has a Buyer 2120 as a client, who is a trader. The Buyer 2120 has a buyer's client computer 2121, which has a UI 2122.

In the example of FIG. 21, a first open buy order 2161 is received from computer 2121. Upon receipt, an estimated first tax may be determined for Buyer 2120, and an Estimated Tax Notification to Buyer (ETNB) 2124 may be sent to computer 2121. The estimated first tax may appear on UI 2122.

The received order 2161 is processed by module 2012 for matching. In the example of FIG. 21, an aspect of the first order 2161 is forwarded to an OTE 2160. In this example, the forwarded aspect is a forwarded open buy order 1466. The OTE 2160 received the forwarded open buy order 1466 order, matches it, and then sends to the OSP 2098 an aspect 2163 of the matched second order as part of a match notification 2168. The match notification may also be called trade confirmation.

Then the tax(es) determination module 2014 may determine any taxes due, and sends a notification 2128 to the client computer 2121. Sometimes the notification 2128 is part of the entire trade confirmation. In other use cases, all or a portion only (e.g. only the rate) of the tax determination has been made by the OTE 2160, and the OSB 2098 passes it to the client.

In the example of FIG. 21, the buyer 2120 is due to file returns and remit taxes to two tax authorities, namely Tax Authority C' 2159-1 and Tax Authority D' 2159-2. These could be, for example, federal and state tax authorities. Accordingly, and depending on the preferences settings, the tax return module 2016 prepares a first return 2151 and sends it to a designated computer or server of Tax Authority C' 2159-1, and prepares a second return 2152 and sends it to a designated computer or server of Tax Authority D' 2159-2.

The determination of tax obligation(s) 1779 of FIG. 17 may range from simple to complex. Beyond the federal government, a number of tax jurisdictions may assert a transaction tax for the purchase and/or sale of securities, such as various states, counties, cities, municipalities, special taxing jurisdictions, and so on. In addition, such taxes could be used to fund different programs of social usefulness for a country, such as, in the US, Social Security and Medicare. The more tax jurisdictions assert such a transaction tax, the more complex the determination of tax obligation(s) 1779 will become. Plus, each jurisdiction may require different schedules for returns and remittances, from annual to quarterly, to monthly, to weekly, to daily, or even per transaction. And the schedule requirements for returns might not be coordinated with the schedule requirements for remittances. Plus, it will be tough to keep up with changes in the tax obligations, and so on.

The above described embodiments provide for online stock brokers to import a determination of a tax due from a transaction from a specialist online facility. An example is now described.

Figure 22:
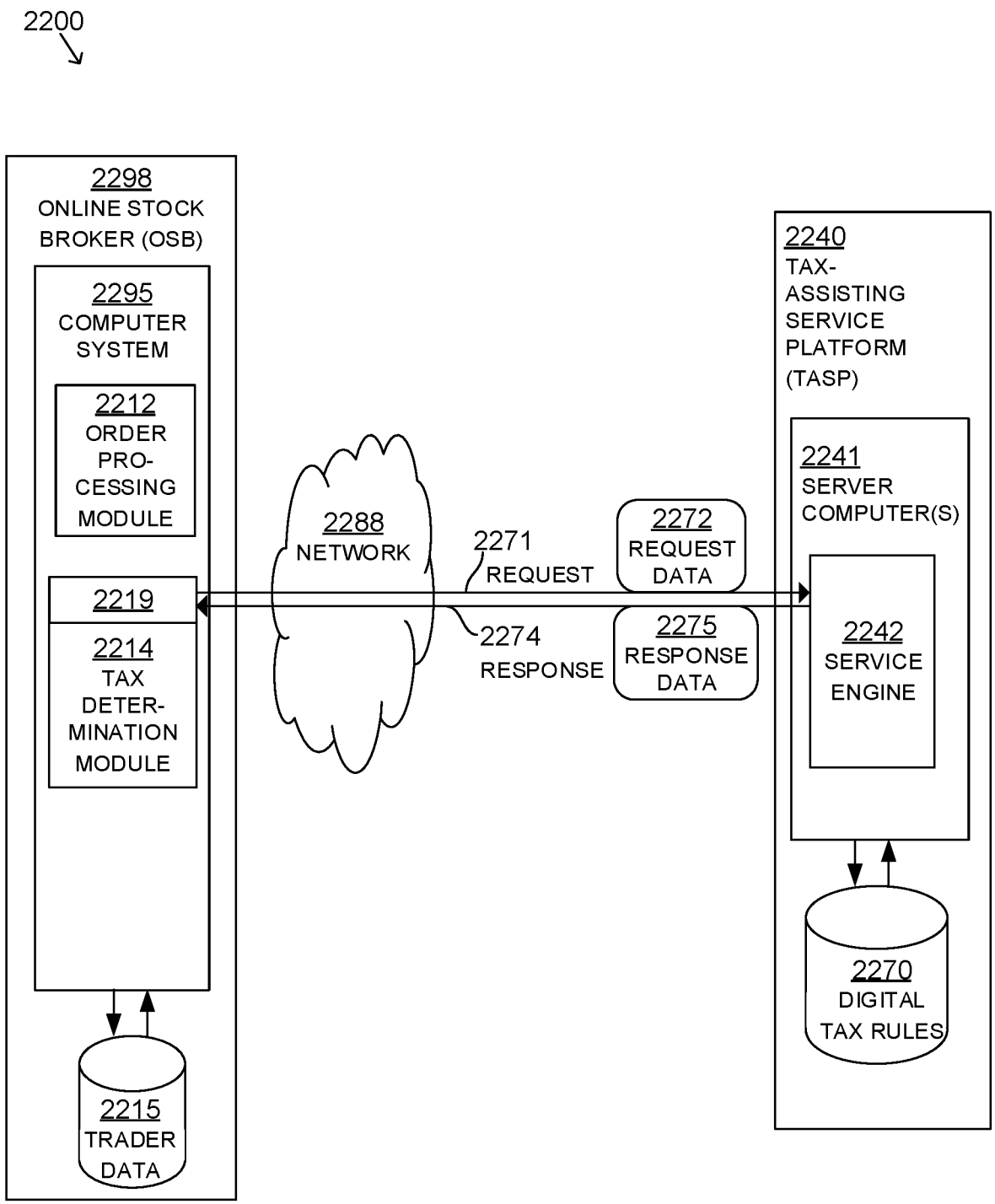
FIG. 22 is a diagram of a sample arrangement of entities and components for a use case where an online stock broker imports a determination of a tax due from a transaction from a specialist online facility.

FIG. 22 is a diagram of a sample arrangement 2200, in which an OSB 2298 imports a determination of a tax amount from a Tax-Assisting Service Platform (TASP) 2240 that is a specialist facility.

The TASP 2240 has at least one or more server computers 2241 that implement a service engine 2242. The TASP 2240 also has a memory 2270, which may be implemented as a database, and stores digital tax rules. The digital tax rules 2270 may be updated as they are being created, also for exceptions and exemptions imposed by law. Such exceptions and exemptions can be, for example, based on certain transaction size, securities traded (for instance, government bonds may be exempt), certain trading institutions or individuals, tax holidays, and so on. The service engine 2242 may query the memory 2270 for determining one or more tax obligations. Querying can be to fetch digital rules and rates, and the memory 2270 can respond by supplying these rules and rates. The service engine 2242 may be able to recognize elements needed for recognizing which tax jurisdiction could have authority to tax the transaction. These may include trader data, such as citizenship and the locus data, plus possibly other data, such as the incorporation state of the security being traded which, for example, could be correlated with the jurisdiction boundaries of FIG. 18, etc.

The OSB 2298 has a computer system 2295, similarly with the computer system 2095 of the OSB 2098. In this example, the OSB 2298 also has a memory 2215, which can be implemented as a database. The memory 2215 may store trader data, including data that needs to be looked up for determining transaction tax. Such data may include the official residence of the trader, their IP address, and so on.

The computer system 2295 has an order processing module 2212, similarly with the order processing module 2012 in FIG. 20. The computer system 2295 also has a tax(es) determination module 2214. In this example, module 2214 outsources the determination to TASP 2240 via an OSB application ("app") 2219, which can be as was described for OSP app 919 of FIG. 9. Briefly, the OSB application 2219 transmits a request 2271 via a network 2288, which can be as network 188. The request 2271 includes request data 2272, which can be a payload and is also known as the request object. The request data 2272 includes data for determining the tax obligations due from a securities transaction. The request 2271 requests the determination of a tax. The request 2271 is received by the service engine 2242, which in turn determines the requested tax obligation(s) responsive to the request. Then the server computer(s) 2241 sends a response 2274 responsive to the received request 2271. The response 2274 includes response data 2275, which are the requested tax obligation, or an aspect of it, and so on.

The OSB 2298 could have other features for determining the tax natively. This could be for all the transactions, or at least for estimates. The OSB application ("app") 2219 could be thus invoked only some times.

FIG. 23 is a diagram of a sample User Interface (UI) 2322, as it may appear for UI 2022 in FIG. 20. In this example, a trading order has been input, which has: a polarity value 2341 of BUY, a trading symbol 2342 of MSFT which is the trading sign of common shares of Microsoft, Inc., a size number 2343 of 100 meaning 100 shares, and a range value 2344 of MARKET, which speaks to the numerical acceptable range of price for this order, and does not limit it.

An ETNB has been returned, similar to the ETNB 2024, which supplies further values to the UI 2322. These further values include an estimated base amount to be spent for the trade itself (2371), a commission (2372), an estimated Federal tax (2373), an estimated State tax (2374), an estimated other tax (2375), and an estimated total amount (2376) that adds all the taxes 2373, 2374, 2375 to the estimated base amount to be spent for the trade itself (2371).

At the bottom right, a link labeled Place Order enables the trader to place the order as presented.

FIG. 24 is a diagram of a sample User Interface (UI) 2432, as it may appear for UI 2032 in FIG. 20. In this example, a trading order has been input, which has: a polarity value 2451 of SELL, a trading symbol 2452 of MSFT, a size number 2453 of 100, and a range value 2454 of MARKET, which speaks to the numerical acceptable range of price.

An ETNS has been returned, similar to the ETNS 2034, which supplies further values to the UI 2432. These further values include an estimated base amount to be received from the trade itself (2471), a commission (2472), an estimated Federal tax (2473), an estimated State tax (2474), an estimated other tax (2475), and an estimated total amount (2476) that subtracts all the taxes 2473, 2474, 2475 from the estimated base amount to be received from the trade itself (2471). At the bottom right, a link labeled Place Order enables the trader to place the order as presented.

It will be observed that this example was created where the buy order of FIG. 23 is compatible with the sell order of FIG. 24. So, they could be matched, or each could be matched against the broker's own supply (internalization), and so on.

These orders may be executed for different strike prices. An example is now described.

FIG. 25 is a diagram of a sample User Interface (UI) 2528, as it may appear for UI 2022 in FIG. 20, upon receiving trade confirmation 2028. The UI 2528 confirms that 100 shares of MSFT have been purchased, and at what price. The UI 2528 also informs of: the actual base amount spent for the trade itself (2571), the actual Federal tax (2573) that will be reported to the Federal Government and paid on behalf of the buyer, the actual State tax (2574) that will be reported to the buyer's State Government and paid on behalf of the buyer, the actual other tax (2575), and the actual total amount (2576) that added all the taxes 2573, 2574, 2575 to the actual base amount (2571).

In the methods described above, each operation can be performed as an affirmative act or operation of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

A person skilled in the art will be able to practice the present invention in view of this description, which is to be taken as a whole. Details have been included to provide a thorough understanding. In other instances, well-known aspects have not been described, in order to not obscure unnecessarily this description.

Some technologies or techniques described in this document may be known. Even then, however, it does not necessarily follow that it is known to apply such technologies or techniques as described in this document, or for the purposes described in this document.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

A number of embodiments are possible, each including various combinations of elements. When one or more of the appended drawings—which are part of this specification—are taken together, they may present some embodiments with their elements in a manner so compact that these embodiments can be surveyed quickly. This is true even if these elements are described individually extensively in this text, and these elements are only optional in other embodiments.

In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claimed invention.

In this document, the phrases "constructed to", "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Parent patent applications: Any and all parent, grandparent, great-grandparent, etc. patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, component or process that are identical or at least similar or related. Where made, such a further effort was not required, but was nevertheless made gratuitously so as to accelerate comprehension by the reader. Even where made in this document, such a further effort might not have been made completely consistently for all of the versions or embodiments that are made possible by this description. Accordingly, the description controls in defining an item, aspect, component or process, rather than its reference numeral. Any similarity in reference numerals may be used to infer a similarity in the text, but not to confuse aspects where the text or other context indicates otherwise.

The claims of this document define certain combinations and sub-combinations of elements, features and acts or operations, which are regarded as novel and non-obvious. The claims also include elements, features and acts or operations that are equivalent to what is explicitly mentioned. Additional claims for other such combinations and sub-combinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that the claim can have one or more of this component or this item.

In construing the claims of this document, 35 U.S.C. § 112(f) is invoked by the inventor(s) only when the words "means for" or "steps for" are expressly used in the claims. Accordingly, if these words are not used in a claim, then that claim is not intended to be construed by the inventor(s) in accordance with 35 U.S.C. § 112(f).

What is claimed is:

1. A method for a computer system, the method including at least:
electronically receiving, by the computer system via a network, a first dataset from a first remote client device, the first dataset having first values, the first values including a first polarity value that is one of two opposite possible values, a certificate code value that identifies a certain certificate of the first dataset from a plurality of certificates, a first size number that identifies a number of units of the certain certificate of the first dataset, and at least one first range value defining a first numerical acceptable range for matching the first dataset;
processing, by the computer system and responsive to receiving a confirmation, the first dataset so as to electronically match, by the computer system, the first dataset with another dataset, the processing including:
an online software platform (OSP) computing system application electronically fetching from computer memory the first dataset;
the online software platform (OSP) computing system application electronically fetching from computer memory a second dataset;
the OSP computing system application electronically forming a request object regarding a first resource for the first dataset with the second dataset;
responsive to the OSP computing system application electronically forming the request object regarding the first resource for the first dataset with the second dataset, the OSP electronically sending the request object regarding the first resource for the first dataset with the second dataset to an electronic service engine communication networking protocol component, responsive to the electronic service engine communication networking protocol component electronically receiving the request object, the electronic service engine communication networking protocol component electronically transmitting, as a background operation while simultaneously processing other datasets, the request object to the electronic service engine;
the electronic service engine electronically determining whether the first dataset is electronically compatible with the second dataset for the first resource to be electronically produced by application of digital rules by a computing system for the first dataset, the electronically determining whether the first dataset is electronically compatible with the second dataset for a first resource to be electronically produced by application of digital rules by a computing system for the first dataset including:
electronically detecting from the first dataset the first polarity value;
electronically detecting from the second dataset a second polarity value;
responsive to the electronic detection of the first polarity value and the electronic detection of the second polarity value, electronically determining whether the first dataset and the second dataset have opposite polarity values;
electronically detecting from the first dataset the certificate code value of the first dataset;
electronically detecting from the second dataset a certificate code value of the second dataset that identifies the certain certificate of the second dataset;
responsive to the electronic detection of the certificate code value of the first dataset and the certificate code value of the second dataset, electronically determining whether certificate values of the first dataset and the second dataset are the same;
in response to the electronic determination that the certificate values of the first dataset and the second dataset are the same, electronically saving in computer memory a common certificate code value in a specialized matched values set data structure;
electronically detecting from the first dataset the at least one first range value;
electronically detecting from the second dataset at least one second range value defining a second numerical acceptable range for matching the second dataset;
responsive to the electronic detection from the first dataset the at least one first range value and the electronic detection from the second dataset the at least one second range value, electronically detecting a strike number that is within both the first numerical acceptable range of the first dataset and the second numerical acceptable range of the second dataset;
responsive to the electronic detection of the strike number:
electronically saving in computer memory the strike number value in the specialized matched values set data structure; and
electronically enabling electronic determination of a matched size number of units that is not larger than the first size number and a second size number of the second dataset, in which the second size number identifies a number of units of the certain certificate of the second dataset;
electronically detecting from the first dataset the first size number;
electronically detecting from the second dataset the second size number;
electronically determining the matched size number based on the first size number and second size number; and responsive to electronically determining the matched size number, electronically matching the first dataset to the second dataset;

the electronic service engine electronically sending a response based on the matching the first dataset to the second dataset to the electronic service engine communication networking protocol component; and responsive to the electronic service engine communication networking protocol component receiving the response based on the matching the first dataset to the second dataset, the electronic service engine communication networking protocol component electronically sending, as a background operation while simultaneously processing other datasets, the response to the OSP computing system application;

establishing, by the computer system and responsive to the processing, that the matching has been achieved between the first dataset and a second dataset, the second dataset having second values, the second values including the second polarity value opposite to the first polarity value, the certificate code value that identifies the certain certificate of the second dataset, the second size number that identifies the number of units of the certain certificate of the second dataset, and the at least one second range value defining the second numerical acceptable range for matching the second dataset, the matching having been performed at the strike number that is within both the first numerical acceptable range and the second numerical acceptable range, the matching having been further performed for the matched size number of units that is not larger than the first size number and the second size number;

inputting, by the computer system and responsive to establishing the matching, the first resource for the first dataset, the first resource having a numerical non-zero value, the first resource determined from digital main rules, at least some of the digital main rules including respective conditions and respective consequents associated with the respective conditions, in which it has been recognized that a certain condition of a certain one of the digital main rules is met by at least one of the first values or the second values, the certain one of the digital main rules having a certain consequent, the first resource having been determined by applying the certain consequent to one of the first values or the second values; and causing, by the computer system and responsive to the inputting, a first notification to be transmitted via the network to the first remote client device, the first notification being about an aspect of the first resource.

2. The method of claim 1, in which:
the first size number is larger than the second size number, and
the matched size number equals the second size number.

3. The method of claim 1, in which:
the certain consequent indicates a percentage, and
the first resource is determined by multiplying the percentage with the strike number.

4. The method of claim 1, in which:
the certain consequent indicates a percentage, and
the first resource is determined by multiplying the percentage with the matched size number.

5. The method of claim 1, in which:
the certain consequent indicates a percentage, and
the first resource is determined by multiplying the percentage with the strike number and with the matched size number.

6. The method of claim 1, in which:
the first resource has a non-integer value.

7. The method of claim 1, in which:
data of the digital main rules are stored in the form of at least one look-up table.

8. The method of claim 1, in which:
the first values further include an entity value for a user of the first remote client device,
locus information of the user is determined from the entity value, and
the recognizing is performed responsive to the certain condition being met by the locus information.

9. The method of claim 8, in which:
the locus information is encoded in the entity value.

10. The method of claim 8, in which:
the entity value encodes an identity of the user,
a stored record of the identity of the user contains the locus information,
the stored record is identified from the entity value, and
the locus information is looked up from the identified record.

11. The method of claim 1, further including:
computing, by the computer system and responsive to receiving the first dataset, an estimated first resource for the first dataset, the estimated first resource having a numerical non-zero value that is computed from the first size number and from the digital main rules;
causing, by the computer system, a preliminary notification to be transmitted to the first remote client device, the preliminary notification including an aspect of the estimated first resource; and
then receiving, by the computer system from the first remote client device, a confirmation of the first dataset.

12. The method of claim 11, in which:
the inputted first resource is the same as the estimated first resource.

13. The method of claim 1, in which:
the first notification also includes the certificate code value.

14. The method of claim 1, in which:
the first notification includes a sum of the first resource plus a product of the strike number times the matched size number.

15. The method of claim 1, further including:
causing, by the computer system, a formal notification distinct from the preliminary notification and the first notification to be transmitted via the network about an aspect of the first resource to a designated device that is not controlled by a user of the first remote client device or by a user of the computer system.

16. The method of claim 15, in which:
the designated device is designated by the user of the first remote client device.

17. The method of claim 15, in which:
the designated device is designated by the user of the computer system.

18. The method of claim 15, further including:
causing, by the computer system, a user interface to present an option to a user of the first remote client device to input a preference setting;
receiving, by the computer system from the first remote client device, a preference setting inputted from the presented option;
storing, by the computer system, the inputted preference setting; and in which the formal notification is caused to be transmitted to the designated device only if the inputted preference setting has been stored.

19. The method of claim 1, further including:
creating, by the computer system, a document that includes an aspect of the first resource; and
causing, by the computer system, the document to be transmitted via the network to a designated device that is not controlled by a user of the first remote client device or by a user of the computer system.

20. The method of claim 19, in which:
the designated device is designated by the user of the first remote client device.

21. The method of claim 19, in which:
the designated device is designated by the user of the computer system.

22. The method of claim 19, further including:
causing, by the computer system, a user interface to present an option to a user of the first remote client device to input a preference setting;
receiving, by the computer system from the first remote client device, a preference setting inputted from the presented option; and
storing the inputted preference setting; and
in which the document is caused to be transmitted to the designated device only if the inputted preference setting has been stored.

23. The method of claim 1, in which:
the first resource is inputted responsive to the first resource being determined by the computer system.

24. The method of claim 1, further including:
transmitting, by the computer system via a network, a request to an online assisting platform, the request including at least one of the first values or the second values, the first resource being determined by the online assisting platform responsive to the request; and
receiving, by the computer system, a response responsive to the request from the online assisting platform, an aspect of the first resource being inputted from the received response.

25. The method of claim 1, further including:
receiving, by the computer system via the network, additional datasets, and
in which: the processing includes selecting the second dataset from the additional datasets responsive to the second dataset meeting one or more compatibility criteria, and
the establishing is performed responsive to selecting the second dataset.

26. The method of claim 25, in which:
the second dataset is received from a second remote client device, and
further including:
inputting, by the computer system, a second resource for the second dataset, the second resource having a numerical value that is determined also from the strike price; and
causing, by the computer system, a second notification to be transmitted about an aspect of the second resource to the second remote client device.

27. The method of claim 26, in which:
the first resource is inputted by being determined by the computer system, and
the second resource is inputted by being determined by the computer system.

28. The method of claim 25, further including:
transmitting, by the computer system via a network, a request to an online assisting platform, the request including at least one of the first values or the second values, the first resource being determined by the online assisting platform; and
receiving, by the computer system, a response responsive to the request from the online service platform, the first resource and the second resource being inputted from the received response.

29. The method of claim 28, further including:
receiving, from the online assisting platform, a document about the second resource, and
causing the document to be made available to the second remote client device.

30. The method of claim 1, in which:
the processing includes forwarding, by the computer system via the network, an aspect of the first dataset to an online dataset matching module, and receiving, by the computer system, an aspect of the second dataset in response to the forwarding, and
the establishing is performed responsive to receiving the aspect of second dataset.

31. The method of claim 1, further including:
causing, by the computer system, a first formal notification to be transmitted via the network to a first designated device that is not controlled by a user of the first remote client device or by a user of the computer system, the first formal notification encoding the first resource;
inputting, by the computer system and responsive to establishing the matching, a supplemental resource for the first dataset, the supplemental resource computed from the digital main rules; and
causing, by the computer system, a second formal notification to be transmitted via the network to a second designated device that is not controlled by a user of the first remote client device or by a user of the computer system or by a user of the first designated device, the second first formal notification encoding the supplemental resource, and
in which: the first notification encodes the first resource and the supplemental resource.

32. The method of claim 31, in which:
the supplemental resource having a numerical non-zero value, and
the first notification encodes a sum of the first resource and the supplemental resource.

33. The method of claim 31, in which:
the OSP electronically sending the request object regarding the first resource for the first dataset with the second dataset to an electronic service engine communication networking protocol component includes the OSP electronically sending the request object regarding the first resource for the first dataset with the second dataset to an electronic service engine Representational State Transfer (REST) Application Programming Interface (API);
the electronic service engine communication networking protocol component electronically transmitting, as a background operation while simultaneously processing other datasets, the request object to the electronic service engine includes, responsive to the electronic service engine communication networking protocol component electronically receiving the request object, the electronic service engine REST API transmitting, as a background operation while simultaneously processing other datasets, the request object to the electronic service engine;

the electronic service engine electronically sending a response based on the matching the first dataset to the second dataset to the electronic service engine communication networking protocol component includes the electronic service engine electronically sending a response based on the matching the first dataset to the second dataset to the electronic service engine REST API; and the electronic service engine communication networking protocol component electronically sending, as a background operation while simultaneously processing other datasets, the response to the OSP computing system application includes, responsive to the electronic service engine REST API receiving the response based on the matching the first dataset to the second dataset, the electronic service engine REST API electronically sending, as a background operation while simultaneously processing other datasets, the response to the OSP computing system application.

\* \* \* \* \*